(12) United States Patent
Uchimura

(10) Patent No.: US 8,638,861 B2
(45) Date of Patent: Jan. 28, 2014

(54) REPRODUCING APPARATUS, REPRODUCING METHOD AND REPRODUCING PROGRAM

(75) Inventor: Kouichi Uchimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1831 days.

(21) Appl. No.: 11/677,357

(22) Filed: Feb. 21, 2007

(65) Prior Publication Data

US 2007/0198932 A1    Aug. 23, 2007

(30) Foreign Application Priority Data

Feb. 22, 2006 (JP) ................................. 2006-045703

(51) Int. Cl.
*G06F 21/00* (2013.01)

(52) U.S. Cl.
USPC ........... 375/240.26; 375/240.01; 375/240.28; 715/723; 386/200; 386/240; 386/241

(58) Field of Classification Search
USPC ....... 386/353; 382/305; 715/723; 375/240.26
See application file for complete search history.

(56) References Cited

U.S. PATENT DOCUMENTS

| 6,148,138 A * | 11/2000 | Sawabe et al. | 386/241 |
| 7,206,499 B2 * | 4/2007 | Ando et al. | 386/241 |
| 7,403,695 B2 * | 7/2008 | Kikuchi et al. | 386/241 |
| 7,848,598 B2 * | 12/2010 | Nagatani et al. | 382/305 |
| 7,965,921 B2 * | 6/2011 | Chung et al. | 386/240 |

FOREIGN PATENT DOCUMENTS

| JP | 08-331526 | 12/1996 |
| JP | 09-037199 | 2/1997 |
| JP | 2001-186446 | 7/2001 |
| JP | 2002-290899 | 10/2002 |
| JP | 2002-314953 | 10/2002 |
| JP | 2002-335490 | 11/2002 |
| JP | 2003-046960 | 2/2003 |
| JP | 2004-304767 | 10/2004 |
| JP | 2005-303791 | 10/2005 |
| JP | 2006-246496 | 9/2006 |
| WO | 2004/095837 | 11/2004 |
| WO | 2005/079064 | 8/2005 |

OTHER PUBLICATIONS

Japanese Office Action issued on Oct. 5, 2010, for corresponding Japanese Patent Application No. 2006-045703.
Japanese Patent Office, Notice of reasons for refusal, issued in connection with Japanese Patent Application No. 2011-092052, dated May 15, 2012. (4 pages).

* cited by examiner

*Primary Examiner* — Taghi Arani
*Assistant Examiner* — Jason Lee
(74) *Attorney, Agent, or Firm* — K&L Gates LLP

(57) ABSTRACT

A reproducing apparatus and method are provided. The apparatus includes an input section; an operation input section; a first storage section; and a control section.

12 Claims, 26 Drawing Sheets

| ITEM | PRESCRIBED SUBSTANCE |
|---|---|
| MOVING PICTURE PLANE | 1,920 × 1,080 × 16 BITS, YCbCr (4:2:2), EACH 8 BITS |
| CAPTION PLANE | 1,920 × 1,080 × 8 BITS, 8-BIT COLOR MAP ADDRESS (PALETTE) + 256 STAGES OF ALPHA BLENDING |
| GRAPHICS PLANE | 1,920 × 1,080 × 8 BITS, 8-BIT COLOR MAP ADDRESS (PALETTE) + 256 STAGES OF ALPHA BLENDING |

FIG.12

| INPUT | INPUT ADDRESS, 8 BITS |
|---|---|
| OUTPUT | OUTPUT DATA, 8 BITS x 4, (R, G, B, $\alpha$) OUTPUT |

FIG.13

| | VALUES OF PRIMARY COLORS | | | OPACITY |
|---|---|---|---|---|
| COLOR INDEX VALUE | R | G | B | $\alpha$ |
| 0x00 | 0 | 0 | 0 | 0 |
| 0x01 | 10 | 100 | 30 | 0.5 |
| ⋮ | ⋮ | ⋮ | ⋮ | |
| ⋮ | ⋮ | ⋮ | ⋮ | |
| 0xFF | 200 | 255 | 100 | 0.8 |

FIG.15
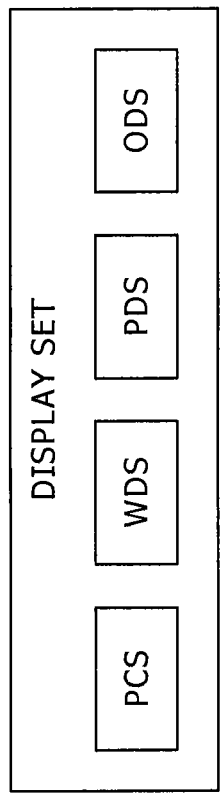
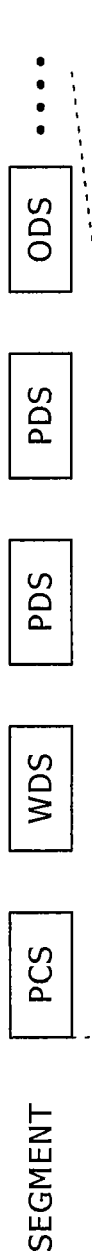
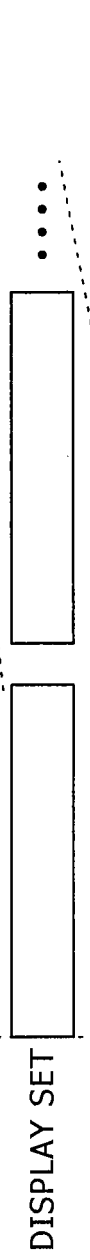
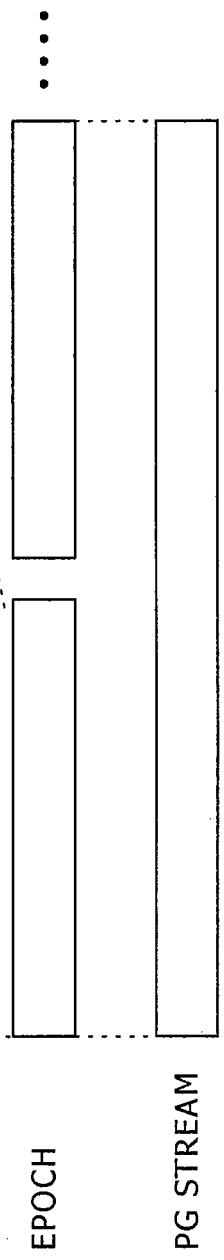
FIG.16A  SEGMENT
FIG.16B  DISPLAY SET
FIG.16C  EPOCH
FIG.16D  PG STREAM

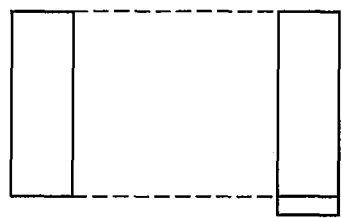
FIG. 17A SEGMENT
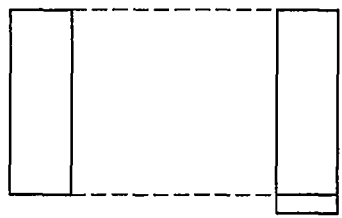
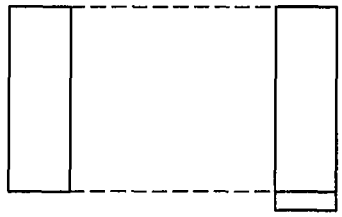
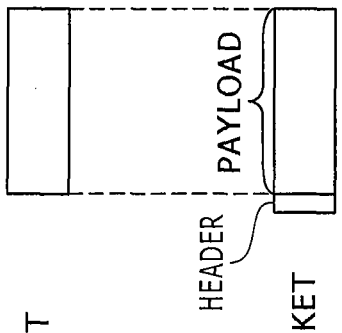
FIG. 17B PES PACKET
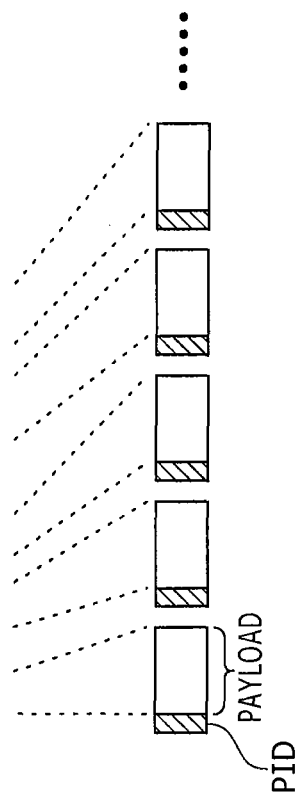
FIG. 17C TS PACKET

FIG.18

| SYNTAX | DATA LENGTH (BITS) | MNEMONIC |
|---|---|---|
| presentation_composition_segment(){ | | |
|     segment_descriptor() | | |
|     video_descriptor() | | |
|     composition_descriptor() | | |
|     palette_update_flag | 1 | bslbf |
|     reserved | 7 | bslbf |
|     palette_id_ref | 8 | uimsbf |
|     number_of_composition_objects | 8 | uimsbf |
|     for(i=0;i<number_of_composition_objects;i++){ | | |
|         composition_object() | | |
|     } | | |
| } | | |

FIG.19

| SYNTAX | DATA LENGTH (BITS) | MNEMONIC |
|---|---|---|
| composition_object(){ | | |
|     object_id_ref | 16 | uimsbf |
|     window_id_ref | 8 | uimsbf |
|     object_cropped_flag | 1 | bslbf |
|     forced_on_flag | 1 | bslbf |
|     Reserved | 6 | bslbf |
|     composition_object_horizontal_position | 16 | uimsbf |
|     composition_object_vertical_position | 16 | uimsbf |
|     if(object_cropped_flag==1$_b$){ | | |
|         cropping_rectangle(){ | | |
|             object_cropping_horizontal_position | 16 | uimsbf |
|             object_cropping_vertical_position | 16 | uimsbf |
|             object_cropping_width | 16 | uimsbf |
|             object_cropping_height | 16 | uimsbf |
|         } | | |
|     } | | |
| } | | |

FIG. 20

| SYNTAX | DATA LENGTH (BITS) | MNEMONIC |
|---|---|---|
| window_definition_segment(){ | | |
|     segment_descriptor() | | |
|     number_of_windows | 8 | uimsbf |
|     for(i=0;i<number_of_windows;i++){ | | |
|         window() | | |
|     } | | |
| } | | |

FIG. 21

| SYNTAX | DATA LENGTH (BITS) | MNEMONIC |
|---|---|---|
| window(){ | | |
|     window_id | 8 | uimsbf |
|     window_horizontal_position | 16 | uimsbf |
|     window_vertical_position | 16 | uimsbf |
|     window_width | 16 | uimsbf |
|     window_height | 16 | uimsbf |
| } | | |

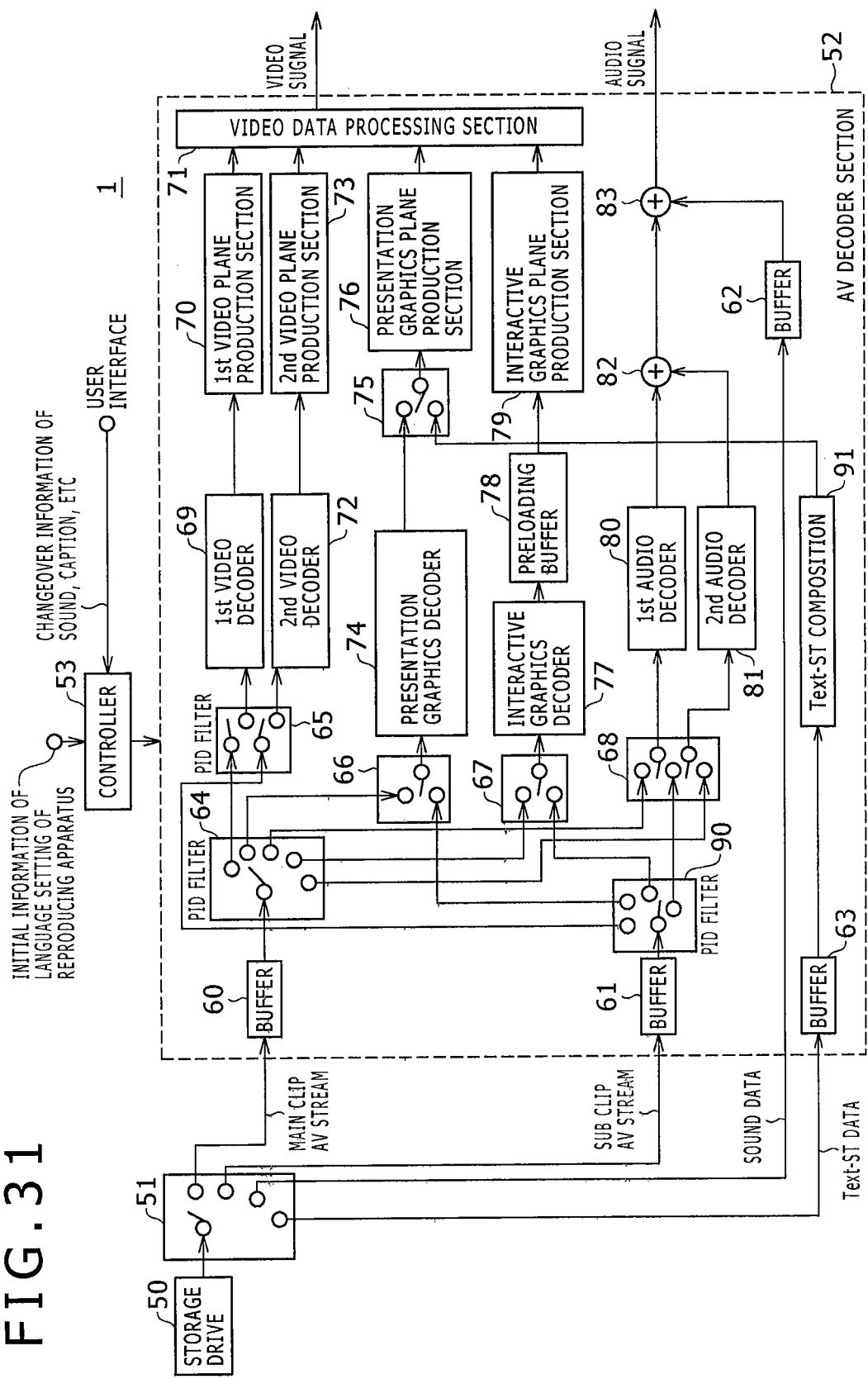

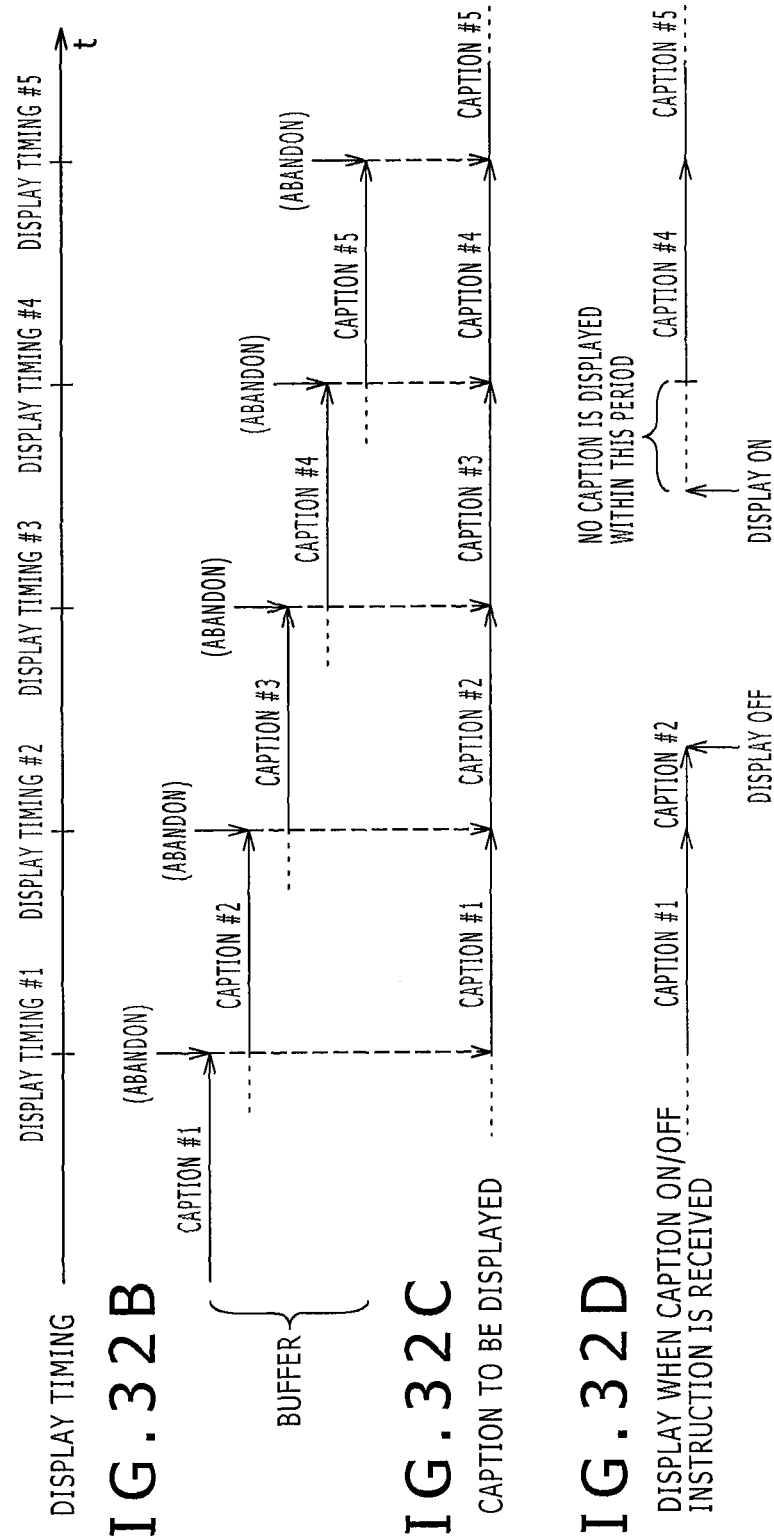

REPRODUCING APPARATUS, REPRODUCING METHOD AND REPRODUCING PROGRAM

CROSS REFERENCES TO RELATED APPLICATIONS

The present application claims priority to Japanese Patent Application JP 2006-045703, filed in the Japanese Patent Office on Feb. 22, 2006, the entire contents of which being incorporated herein by reference.

BACKGROUND

The present application relates to a reproducing apparatus, a reproducing method and a reproducing program wherein a caption can be displayed in response to an interactive operation of a user in accordance with a program recorded on a recording medium having a large capacity such as a Blu-ray Disc (registered trademark).

In recent years, the Blu-ray Disc standards have been proposed for a recordable disc type recording medium which can be removed from a recording and reproducing apparatus. According to the Blu-ray Disc standards, a disc of a diameter of 12 cm and a cover layer thickness of 0.1 mm is used as a recording medium while a blue-violet laser of a wavelength of 405 nm and an objective lens of a numerical aperture of 0.85 are used as an optical system, and a recording capacity of 27 GB (gigabytes) is achieved in the maximum. Where the Blu-ray Disk standards are adopted, a BS digital high definition broadcast in Japan can be recorded for more than two hours without suffering from deterioration of the picture quality.

As sources (supply sources) of AV (Audio/Visual) signals to be recorded on the recordable optical disc, those sources which supply an analog signal, for example, by an analog television broadcast and those sources which provide a digital signal such as, for example, a digital television signal beginning with a BS digital broadcast have been supposed. According to the Blu-ray Disk standards, standards which prescribe methods of recording AV signals from such broadcasts are available already.

On the other hand, development of a read-only recording medium on which a movie or music is recorded in advance according to derivative standards of the Blu-ray Disk at present is proceeding. A DVD (Digital Versatile Disc) is already popularized widely as a disc type recording medium for recording a movie or music. However, a read-only optical disc based on the Blu-ray Disk standards is different much from and superior to an existing DVD in that, by making the most of a large capacity, a high transfer rate and so forth of the Blu-ray Disk, high definition images can be recorded for more than two hours while maintaining high picture quality. The standards for a read-only recording medium according to the Blu-ray Disk are hereinafter referred to as BD-ROM format (Blu-ray Disc Read-Only Format).

One of essential factors to a content to be recorded on a read-only recording medium is the caption. According to the BD-ROM format, a caption is displayed on a plane different from a plane on which a moving picture is displayed, and the plane on which a caption is displayed and the plane on which a moving picture is displayed are combined with each other to display the caption and the moving picture in an overlapping relationship with each other. For example, if the caption plane on which a caption is displayed is disposed in front of the moving picture plane on which a moving picture is displayed and the attribute of transparency is provided to a portion of the caption plane other than the caption, then image data for one image on which the caption is displayed on the moving picture can be constructed.

Japanese Patent Laid-open No. 2004-304767 discloses an apparatus and method wherein, based on the Blu-ray Disc standards (Blu-ray Disc Rewritable Format Ver. 1.0) which are recording and reproducing standards, planes on which a moving picture and a caption are displayed are provided such that a moving picture based on video data and a caption based on caption image data are displayed on one screen.

In the BD-ROM format, caption data for displaying a caption is defined as data which is recorded as text data on and provided together with a recording medium and as data which is recorded as graphics data formed from bitmap data on and provided together with a recording medium.

Where a caption is supplied as text data, the caption data is read in from a disc in advance, for example, upon starting of reproduction of the disc and is retained into a built-in memory of a player. Display of the caption data on the screen may be performed by reading in a font file recorded on the disc and using a font placed in the read in font file or by using a font built in the player in advance.

On the other hand, where a caption is supplied as graphics data, the graphics data (hereinafter referred to as caption image data) for displaying the caption is recorded as stream data on a disc together with video data or the like with information embedded therein which indicates the display time. The caption image data are reproduced from the disc as the video data are reproduced and successively embedded in a predetermined unit into a buffer built in the player. If the display time indicated by the display time information embedded in the caption image data comes, then the caption image data are read out from the buffer and displayed for each predetermined unit.

The unit of caption image data can be determined arbitrarily, for example, by the manufacturer side. For example, one sentence may be determined as one unit or one character may be determined as one unit such that characters are successively displayed. Further, the caption image data are not limited to data for displaying characters.

Further, the caption image data embedded in the buffer are abandoned from the buffer when they are read out from the buffer. In particular, the player side cannot know in advance when and by what amount caption image data are supplied thereto. Therefore, in order to assure the free region of the buffer, the caption image data read out for display are abandoned from the buffer.

Incidentally, according to the BD-ROM format, the on/off state of the caption display can changed over during reproduction by a user operation or using an interactive button. When a caption display off instruction is received, then the caption display is erased by replacing data of a caption displaying portion of the caption plane with data of the transparent attribute. The user operation is an operation by a user, for example, of a remote control commander.

However, caption image data are abandoned from the buffer when they are read out from the buffer for display as described hereinabove, and this gives rise to the following problem. In particular, if a caption display off instruction is issued with regard to a caption being currently displayed, then even if a caption display on instruction is issued again, the caption display may not be re-started immediately.

This is because, since caption image data are abandoned from the buffer at the timing of display thereof, even if a caption display on instruction is issued again after a caption display off instruction is issued, caption image data to be displayed does not exist in the buffer. In this instance, no caption is displayed at all till a timing of next caption display. Where the caption for which the caption display off instruction is issued is the last caption for the moving picture, no caption is displayed until reproduction of the moving picture ends.

This is described more particularly with reference to FIGS. 32A to 32D. FIG. 32A illustrates display timings of caption image data #N (#1 to #5). FIG. 32B illustrates states of the caption image data #N in the buffer. FIG. 32C illustrates the caption image data #N displayed at the display timings. FIG. 32D illustrates the caption image data #N displayed actually when caption display off and on instructions are issued by the user. Caption image data stored in the buffer are successively displayed at the individual display timings and abandoned from the buffer (refer to FIGS. 32A to 32C).

As seen in FIG. 32D, the caption is erased in response to the caption display off instruction, and then at a point of time at which the caption display on instruction is issued in response to a user operation, the caption image data #3 to be displayed upon issuance of the caption display on instruction is abandoned from the buffer already (refer to FIG. 32B). Accordingly, no caption is displayed within a period from the timing of the caption display on instruction to the display timing of the next caption image data #4.

Accordingly, depending upon the authoring situation of the disc, it is not sometimes desirable to change over the on/off state of the caption display through a user operation. Therefore, according to the BD-ROM format, such control as to cause caption display to be performed compulsorily irrespective of the user operation for on/off of the caption display is defined.

Further, in the BD-ROM format, a plurality of, for example, two, captions can be displayed independently of each other on one screen. For example, captions of two different languages can be displayed individually on one screen. The above-described control of whether or not caption display is to be performed compulsorily can be applied to each of the two captions independently of each other. As an example, on/off of display of one of two captions displayed on a screen can be controlled through a user operation while the other caption is displayed compulsorily irrespective of the user operation.

Here, it is assumed that, as seen in FIG. 33A, a caption #1 according to compulsory display setting by which caption display is performed compulsorily irrespective of a user operation and another caption #2 according to non-compulsory display setting by which on/off of the character display is changed over in response a user operation are displayed simultaneously on a screen 200. If a caption display on instruction is issued through a user operation, for example, through an operation of a remote control commander by the user in the state illustrated in FIG. 33A, then both of the caption #1 and the caption #2 are displayed.

Here, if a caption off instruction is issued through another user operation, then the display of the screen 200 changes to such a degree that the caption #1 based on the compulsory display setting remains displayed while the display of the caption #2 based on the non-compulsory display setting disappears, for example, as seen in FIG. 33B.

Now, it is assumed that a caption display on instruction is issued in response to a further user operation in the state of FIG. 33B. When the user issues the caption display on instruction, the user expects that the display of the screen 200 returns to the display illustrated in FIG. 33A wherein both of the caption #1 and the caption #2 are displayed.

However, there is a problem that, depending upon the authoring situation according to the caption #1 and the caption #2, there is the possibility that, even if a caption display on instruction is issued in the state of FIG. 33B, the display of the screen 200 may be placed into a state wherein the caption #2 is not displayed but only the caption #1 is displayed similarly as illustrated in FIG. 33B.

SUMMARY

It is desirable to provide a reproducing apparatus, a reproducing method and a reproducing program wherein, when the caption display is changed over between on and off by a user operation, a caption is displayed appropriately.

According to an embodiment, there is provided a reproducing apparatus including an input section from which at least content data and graphics data having defined reproducing time for being displayed in an overlapping relationship with a main image to be formed from the content data are inputted. The apparatus further includes an operation input section configured to accept a user operation which indicates that an image should be displayed or should not be displayed based on the graphics data, a first storage section into which the graphics data inputted from the input section is stored, a second storage section into which the graphics data read out from the first storage section is stored, an output section configured to form an output image based on the graphics data. The apparatus still further includes a control section configured to read out the graphics data stored in the first storage section at the reproducing time and output the graphics data and to store the graphics data into the second storage section and abandon the graphics data from the first storage section, the control section controlling the first storage section to be cleared when the graphics data of a first unit composed of a plurality of graphics data having a predetermined definition is inputted from the input section. The control section outputs the graphics data stored in the second storage section to the output section in response to the user operation which indicates that an image based on the graphics data should be displayed to the operation input section.

According to another embodiment, there is provided a reproducing method including an input step of inputting at least content data and graphics data having defined reproducing time for being displayed in an overlapping relationship with a main image to be formed from the content data. The method further includes an operation input step of accepting a user operation which indicates that an image should be displayed or should not be displayed based on the graphics data, a storing step of storing the graphics data inputted by the process at the input step into a first storage section, and an output step of forming an output image based on the graphics data. The method still further includes a controlling step of reading out the graphics data stored in the first storage section at the reproducing time, causing the output step to output the graphics data, storing the graphics data into a second storage section and abandoning the graphics data from the first storage section, and controlling the first storage section to be cleared when the graphics data of a first unit composed of a plurality of graphics data having a predetermined definition is inputted by the process at the input step. The controlling step causes the graphics data stored in the second storage section to be outputted at the output section in response to the user operation which indicates that an image based on the graphics data should be displayed and is accepted by the process at the operation input step.

According to a further embodiment, there is provided a reproducing program for causing a computer apparatus to execute a reproducing method including an input step, an operation input step, a storing step, an output step and a controlling step. The input step inputs at least content data and graphics data having defined reproducing time for being displayed in an overlapping relationship with a main image to be formed from the content data. The operation input step accepts a user operation which indicates that an image should be displayed or should not be displayed based on the graphics data. The storing step of storing the graphics data inputted by the process at the input step into a first storage section. The output step forms an output image based on the graphics data. The controlling step reads out the graphics data stored in the first storage section at the reproducing time, causes the output step to output the graphics data, stores the graphics data into a second storage section and abandons the graphics data from the first storage section, and controls the first storage section to be cleared when the graphics data of a first unit composed of a plurality of graphics data having a predetermined definition is inputted by the process at the input step. The controlling step causes the graphics data stored in the second storage section to be outputted at the output section in response to the user operation which indicates that an image based on the graphics data should be displayed and is accepted by the process at the operation input step.

In the reproducing apparatus and method and the reproducing program, graphics data inputted and stored in the first storage section and having defined reproducing time for being displayed in an overlapping relationship with a main image according to content data is read out at the reproducing time to form an output image to be outputted and is stored into the second storage section while it is abandoned from the first storage section. Further, the first storage section is cleared when the graphics data of a first unit composed of a plurality of graphics data having a predetermined definition is inputted. Further, an output image is formed from the graphics data stored in the second storage section in response to the user operation which indicates that an image based on the graphics data should be displayed, and the thus formed output image is outputted. Therefore, when an image displaying instruction is issued after an image non-displaying instruction is issued in response to the user operation, an image based on the graphics data to be displayed at this time can be displayed immediately.

According to a still further embodiment, there is provided a reproducing apparatus including an input section from which at least content data and graphics data having defined reproducing time for being displayed in an overlapping relationship with a main image to be formed from the content data are inputted, and an operation input section configured to accept a user operation which indicates that an image should be displayed or should not be displayed based on the graphics data. The apparatus further includes a display image composition data formation section configured to form display image composition data for configuring a display image based on the graphics data, a first storage section configured to store the display image composition data formed by the display image composition data formation section, and a second storage section configured to store the display image composition data stored in the first storage section. The apparatus still further includes a control section configured to control the first and second storage sections such that the display image composition data formed by the display image composition data formation section is stored into the first storage section at the reproducing time and the display image composition data is stored into the second storage section at the reproducing time and to further control so as to clear the first storage section when the graphics data of a first unit composed of a plurality of graphics data having a predetermined definition is inputted from the input section. The output image data is formed based on the display image composition data stored in the storage section. The control section causes the display image composition data stored in the second storage section to be stored into the first storage section in response to the user operation which indicates that an image based on the graphics data should be displayed to the operation input section.

According to a yet further embodiment, there is provided a reproducing method including an input step of inputting at least content data and graphics data having defined reproducing time for being displayed in an overlapping relationship with a main image to be formed from the content data, an operation input step of accepting a user operation which indicates that an image should be displayed or should not be displayed based on the graphics data, and a display image composition data forming step of forming display image composition data for configuring a display image based on the graphics data. The method further includes a controlling step of controlling first and second storage sections such that the display image composition data formed by the process at the display image composition data formation step is stored into a first storage section at the reproducing time and the display image composition data is stored into a second storage section at the reproducing time and controlling so as to clear the first storage section when the graphics data of a first unit composed of a plurality of graphics data having a predetermined definition is inputted by the process at the input step. The output image data is formed based on the display image composition data stored in the storage section. The controlling step causes the display image composition data stored in the second storage section to be stored into the first storage section in response to the user operation which indicates that an image based on the graphics data should be displayed and is accepted by the process at the operation input step.

According to a yet further embodiment, there is provided a reproducing program for causing a computer apparatus to execute a reproducing method including an input step, an operation input step, a display image composition data forming step, and a controlling step. The input step of inputs at least content data and graphics data having defined reproducing time for being displayed in an overlapping relationship with a main image to be formed from the content data. The operation input step accepts a user operation which indicates that an image should be displayed or should not be displayed based on the graphics data. The display image composition data forming step forms display image composition data for configuring a display image based on the graphics data. The controlling step controls first and second storage sections such that the display image composition data formed by the process at the display image composition data formation step is stored into a first storage section at the reproducing time and the display image composition data is stored into a second storage section at the reproducing time and controls so as to clear the first storage section when the graphics data of a first unit composed of a plurality of graphics data having a predetermined definition is inputted by the process at the input step. The output image data is formed based on the display image composition data stored in the storage section. The controlling step causes the display image composition data stored in the second storage section to be stored into the first storage section in response to the user operation which indicates that an image based on the graphics data should be displayed and is accepted by the process at the operation input step.

In the reproducing apparatus and method and the reproducing program, display image composition data for constituting a display image which is formed based on graphics data to be displayed in an overlapping relationship with a main image according to content data is stored at the reproducing time into the first storage section and is stored into the second storage section. Further, when the graphics data of a first unit composed of a plurality of graphics data having a predetermined definition is inputted, the first storage section is cleared. Further, output image data is formed based on the display image composition data stored in the storage section, and the display image composition data stored in the second storage section is stored into the first storage section in response to the user operation which indicates that an image based on the graphics data should be displayed to the operation input section. Therefore, when an image displaying instruction is issued after an image non-displaying instruction is issued in response to the user operation, an image based on the graphics data to be displayed at this time can be displayed immediately.

Additional features and advantages are described herein, and will be apparent from, the following Detailed Description and the figures.

BRIEF DESCRIPTION OF THE FIGURES

FIG. 12 is a view illustrating an example of input/output data of a palette;

FIG. 13 is a view illustrating an example of a palette table placed in the palette;

FIG. 15 is a diagrammatic view schematically illustrating a composition of a display set;

FIGS. 16A to 16D are diagrammatic views schematically illustrating a logical structure relating to the display set;

FIGS. 17A to 17C are diagrammatic views illustrating an example of a storage form of the display set;

FIG. 18 is a view illustrating syntax representative of a structure of an example of a PCS segment;

FIG. 19 is a view illustrating syntax of an example of a structure of a block composition_objtact( );

FIG. 20 is a view illustrating syntax representative of an example of a structure of a WDS segment;

FIG. 21 is a view illustrating syntax representative of an example of a structure of a block windows;

FIG. 31 is a block diagram showing an example of a composition of a reproducing apparatus which can be applied commonly to the first and second embodiments;

FIGS. 32A to 32D are diagrams illustrating caption display according to a prior art.

DETAILED DESCRIPTION

The present application is described below in further detail with reference to the figures according to an embodiment. First, in order to facilitate understandings, a management structure of a content, that is, AV (Audio/Video) data recorded in a BD-ROM which is a read-only type Blu-ray Disc prescribed in "Blu-ray Disc Read-Only Format Ver. 1.0 part 3 Audio Visual Specifications" relating to the Blu-ray Disc. The management structure of the BD-ROM is hereinafter referred to as BDMV format.

A bit stream coded by a coding method such as, for example, the MPEG (Moving Pictures Experts Group) video method or the MPEG audio method and multiplexed in accordance with the MPEG2 system is called clip AV stream (or AV stream). A clip AV stream is recorded as a file on a disc by a file system defined by the "Blu-ray Disc Read-Only Format part 2" which is one of standards relating to the Blu-ray Disc. This file is hereinafter referred to as clip AV stream file (or AV stream file).

The clip AV stream file is a management unit on the file system but may not necessarily be a management unit which can be recognized readily by a user. Where the convenience to a user is taken into consideration, it is necessary to store a scheme for reproducing an image content divided into a plurality of clip AV stream files collectively as a single content, another scheme for reproducing only part of the clip AV stream files, information for performing special reproduction or program search reproduction and so forth as a database on a disc. This database is prescribed by the "Blu-ray Disc Read-Only Format part 3" which is one of the standards relating to the Blu-ray disc.

Figure 1:
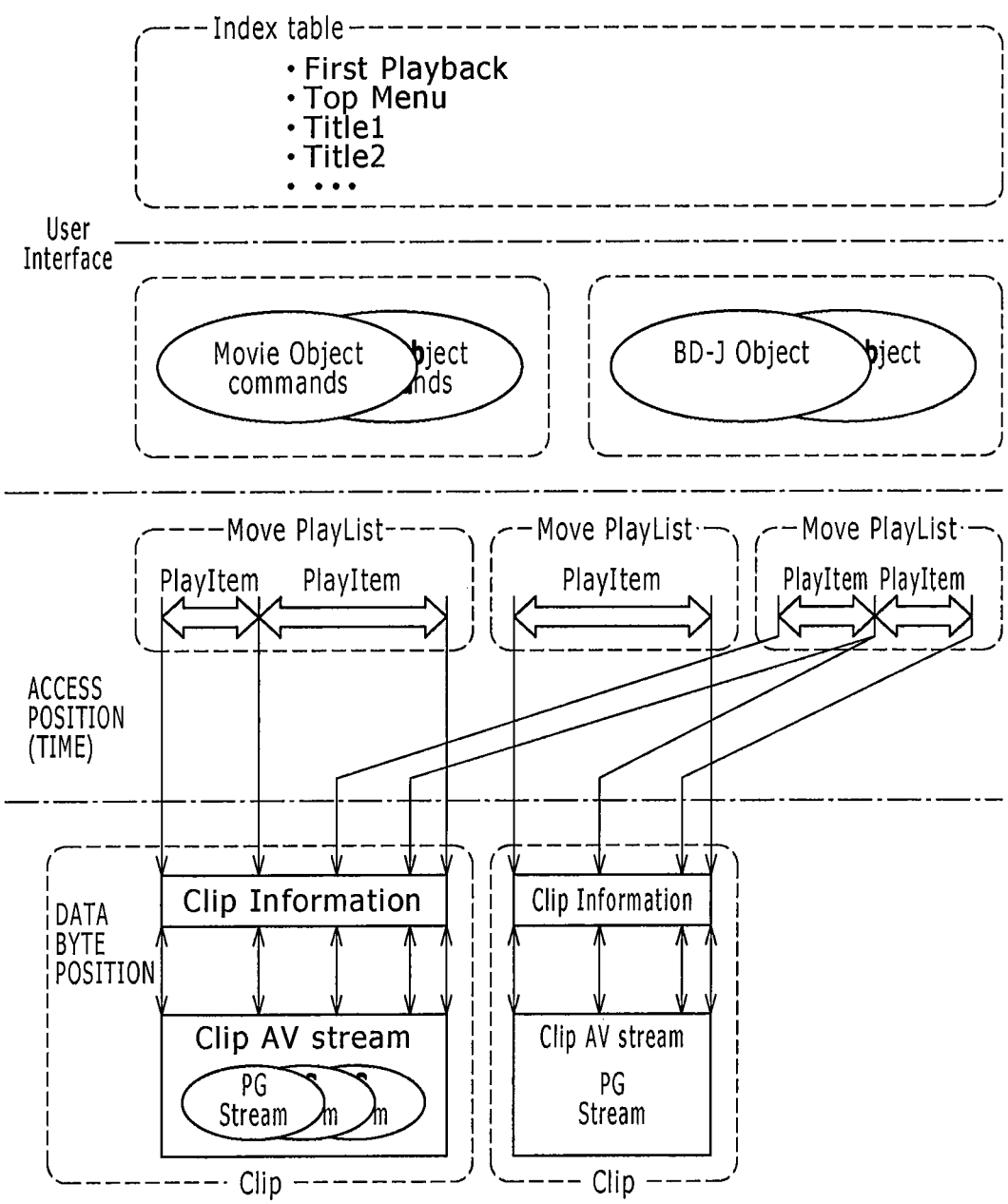
FIG. 1 is a diagrammatic view schematically illustrating a data model of a BD-ROM.

FIG. 1 schematically illustrates a data model of the BD-ROM. Referring to FIG. 1, the data structure of the BD-ROM includes four layers. The lowermost layer has a clip AV stream disposed therein and is hereinafter referred to as clip layer for the convenience of description. In the second lowest layer, a movie playlist (Movie PlayList) for designating a reproducing point of the clip AV stream and a play item (PlayItem) are disposed. The second lowest layer is called playlist layer for the convenience of description. Further, in a layer overlying the playlist layer, a movie object (Movie Object) formed from a command for designating a reproducing order or the like is placed. This layer is hereinafter referred to as object layer for the convenience of description. In the uppermost layer, an index table for managing a title and so forth stored in the BD-ROM is placed. The uppermost layer is hereinafter referred to as index layer for the convenience of description.

The clip layer is described. A clip AV stream is a bit stream wherein video data and/or audio data are multiplexed into an MPEG2 TS (transport stream). Information relating to the clip AV stream is recorded as clip information (Clip Information) into a file.

Further, in the clip AV stream, also a presentation graphics (PG) stream which is a graphics stream for displaying a caption and an interactive graphics (IG) stream formed from data used for menu display are multiplexed.

A clip AV stream file and a clip information file in which corresponding clip information is recorded are regarded as a collected object and hereinafter referred to as clip (Clip). In other words, a clip is one object formed from a clip AV stream and clip information.

A file is usually treated as a byte train. A content of a clip AV stream file is developed on the time axis, and an entry point in a clip is designated principally on the time base. Where a time stamp of an access point to a predetermined clip is given, the clip information file can be used in order to find out address information of an address at which reading out of data is to be started in the clip AV stream file.

The playlist layer is described. A movie playlist is composed of sets of a designation of an AV stream file to be reproduced and a reproducing start point (IN point) and a reproducing end point (OUT point) for designating a reproducing location of the designated AV stream file. One set of information of a reproducing start point and a reproducing end point is referred to as play item (PlayItem). The movie playlist is formed from a set of play items. To reproduce a play item is to reproduce part of an AV stream file which is referred to by the play item. In other words, based on information of the IN point and the OUT point in a play item, a corresponding interval of the clip is reproduced.

The object layer is described. A movie object includes terminal information for causing a HDMV navigation command program (HDMV program) and the movie object to link to each other. The HDMV program is a command for controlling reproduction of a playlist. The terminal information includes information for permitting an interactive operation of a BD-ROM player by a user. A user operation such as a calling operation of a menu screen or a title search operation is controlled based on the terminal information.

A BD-J object includes an object by a Java (registered trademark) program. Since the BD-J object does not have a close relationship to the present application, detailed description thereof is omitted herein.

The index layer is described. The index layer includes an index table. The index table is a table of the top level which defines the title of the BD-ROM disc. Reproduction of the BD-ROM is controlled by a module manager in BD-ROM resident system software based on title information placed in the index table.

Figure 2:
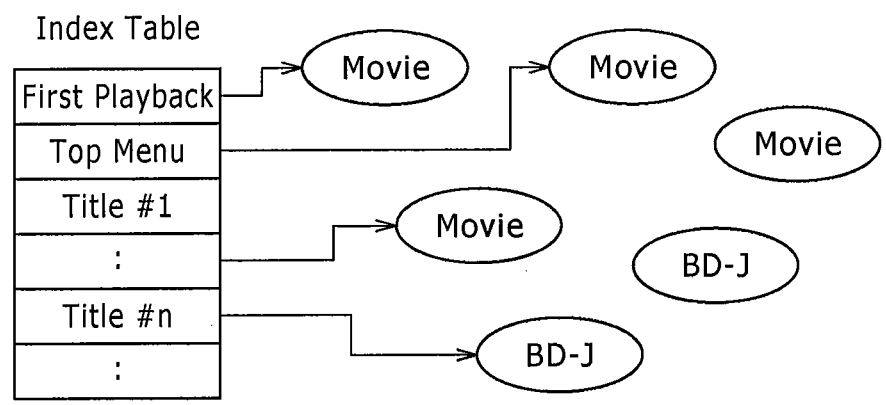
FIG. 2 is a diagrammatic view illustrating an index table.

In particular, as schematically illustrated in FIG. 2, an arbitrary entry in the index table is called title, and all of a first playback (First Playback), a top menu (Top Menu) and titles (Title) #1, #2, ... entered in the index table are titles. Each title indicates a link to a movie object or a BD-J object, and each title indicates a HDMV title or a BD-J title.

For example, the first playback is, if the content placed in the BD-ROM is, for example, a movie, an advertising image (trailer) of a movie company displayed prior to the body of the movie. The top menu is, if the content is, for example, a movie, a menu screen for selecting body reproduction, chapter search, chapter or language setting, privilege image reproduction and so forth. Further, a title is an image selected from the top menu. Also such a composition that a title is a menu screen may be available.

Figure 3:
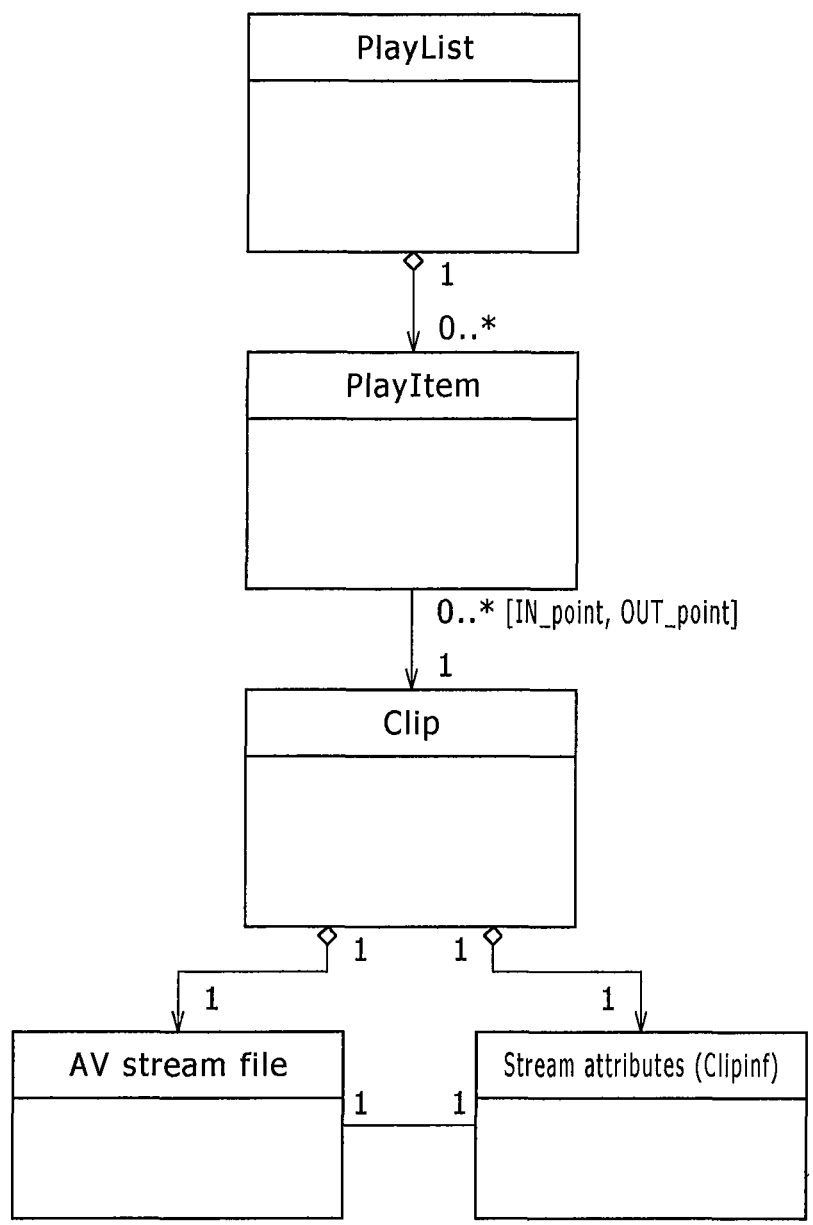
FIG. 3 is a unified modeling language diagram illustrating a relationship among a clip AV stream, clip information, a clip, a play item and a playlist.

FIG. 3 is a UML (Unified Modeling Language) diagram illustrating a relationship among such a clip AV stream, clip information (Stream Attributes), a clip, a play item and a playlist. A playlist is coordinated with one or a plurality of play items, and a play item is coordinated with one clip. A plurality of items whose start points and/or end points are different from each other can be coordinated with one clip. One clip AV stream file is referred to from one clip. In the same way, one clip information file is referred to from one clip. Further, a clip AV stream file and a clip information file are coordinated in a one-one-one corresponding relationship to each other. By defining such a structure as just described, non-destructive reproducing order designation for reproducing only an arbitrary portion can be performed without changing a clip AV stream file.

Figure 4:
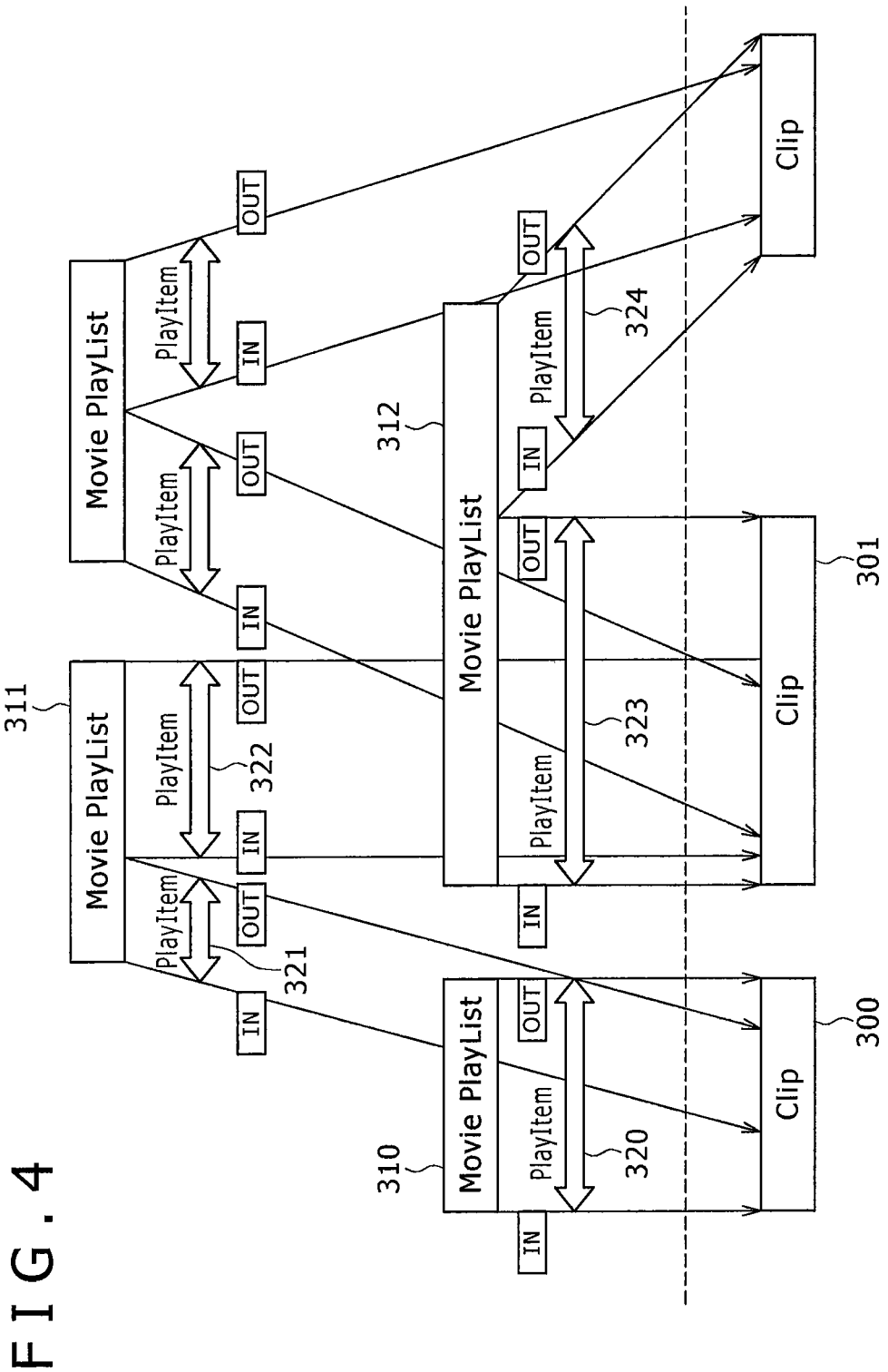
FIG. 4 is a diagrammatic view illustrating a method of referring to the same clip from a plurality of playlists.
Figure 5:
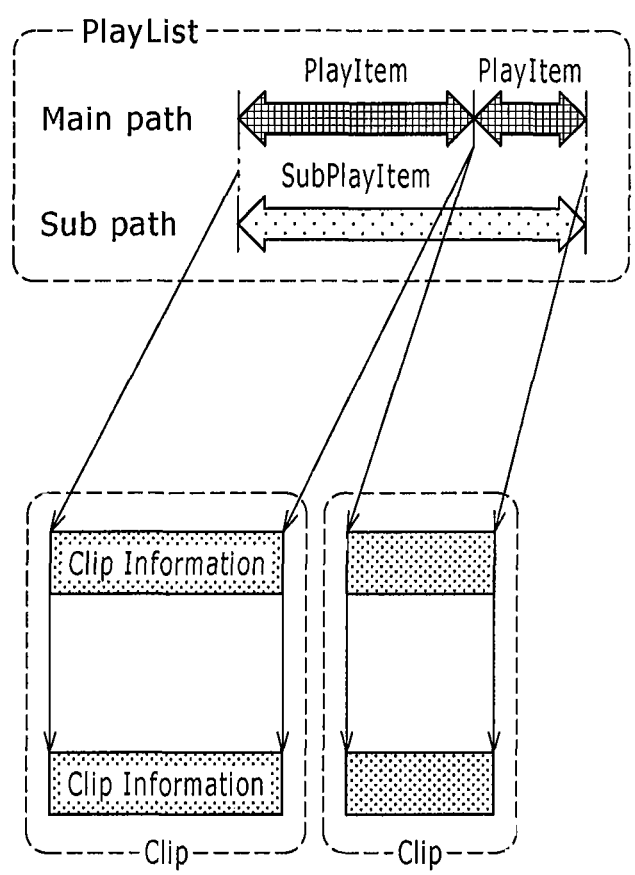
FIG. 5 is a diagrammatic view illustrating a sub path.

Further, also it is possible to refer to the same clip from a plurality of playlists as seen in FIG. 4. Also it is possible to designate a plurality of clips from one playlist. A clip is referred to with an IN point an OUT point indicated by a play item in a playlist. In the example of FIG. 4, a clip 300 is referred to from a play item 320 of a playlist 310, and an interval indicated by an IN point and an OUT point is referred to from a play item 321 from between play items 321 and 322 which form another play list 311. Meanwhile, an interval of a clip 301 indicated by an IN point and an OUT point is referred to from a play item 322 of the play list 311, and an interval indicated by an IN point and an OUT point of an play item 323 from between play items 323 and 324 of a play item 312 is referred to.

It is to be noted that a playlist can have a main path principally corresponding to play items to be reproduced and a sub path corresponding to sub play items. A sub play item is, for example, a play item for after recording audio added to the playlist. Although detailed description is omitted herein, a playlist can have a sub play item only in a case wherein a predetermined condition is satisfied.

Figure 6:
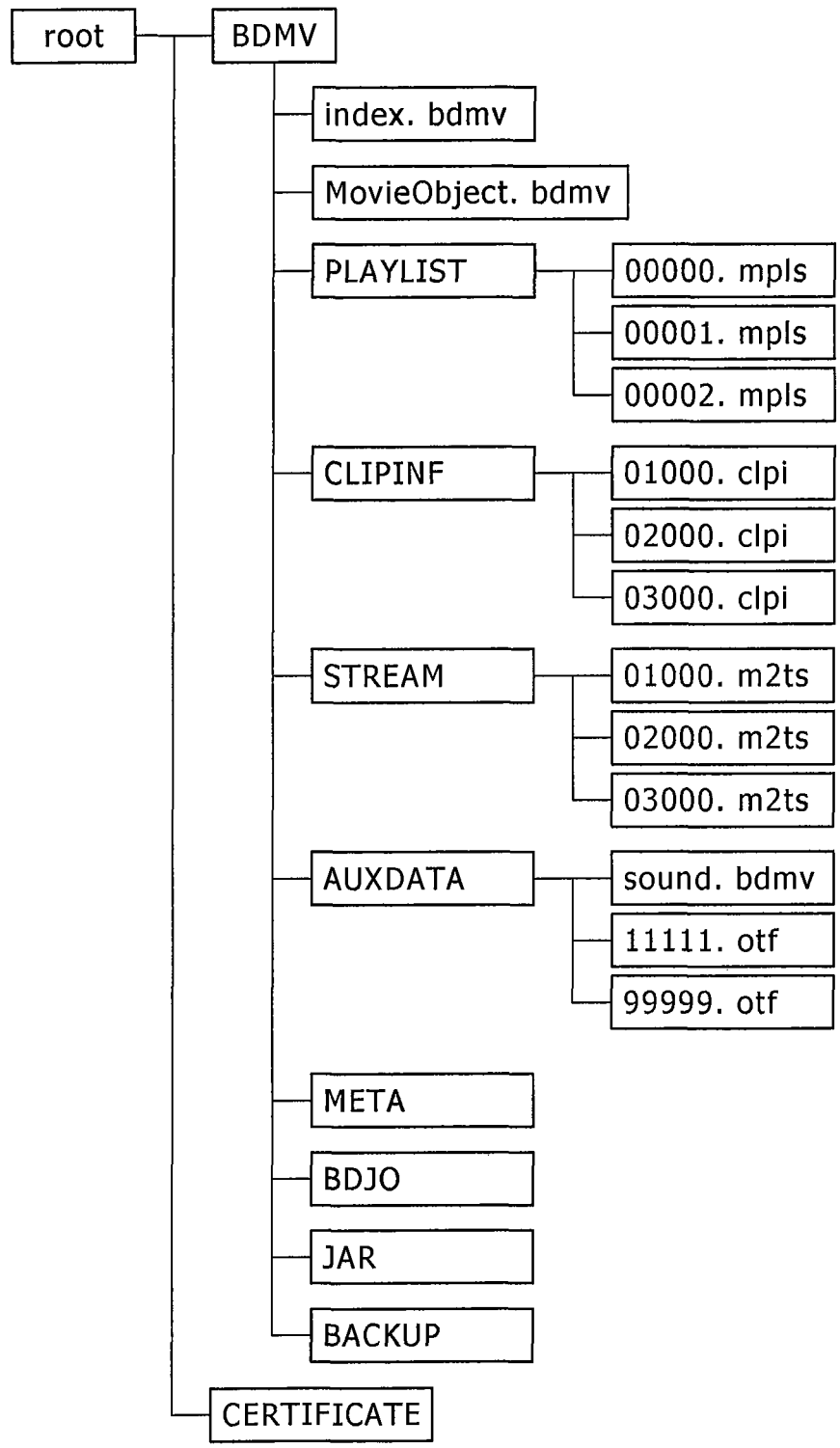
FIG. 6 is a diagram illustrating a management structure for files recorded on a recording medium.

Now, a management structure of a file recorded on a BD-ROM prescribed by the "Blu-ray Disc Read-Only Format part 3" is described with reference to FIG. 6. Files are managed hierarchically in a directory structure. First, a single directory (in the example of FIG. 6, a root directory) is produced on a recording medium. Lower hierarchical layers with respect to the directory make a range to be managed by one recording and reproducing system.

Below the root directory, a directory "BDMV" and another directory "CERTIFICATE" are placed. The directory "CERTIFICATE" has information relating to the copyright placed therein. Meanwhile, the data structure described hereinabove with reference to FIG. 1 is placed in the directory "BDMV".

Immediately below the directory "BDMV", only two files can be placed including a file "index.bdmv" and another file "MovieObject.bdmv". Further, below the directory "BDMV", a directory "PLAYLIST", another directory "CLIPINF", a further directory "STREAM", a still further directory "AUXDATA", a yet further directory "META", a yet further directory "BDJO", a yet further directory "JAR" and a yet further directory "BACKUP" are placed.

The file "index.bdmv" describes the substance of the directory BDMV. In particular, the file "index.bdmv" corresponds to the index table in the index layer which is the uppermost layer described hereinabove. Meanwhile, the file "MovieObject.bdmv" has information of one or more movie objects placed therein. In other words, the file "MovieObject.bdmv" corresponds to the object layer described hereinabove.

The directory "PLAYLIST" has a database of playlists placed therein. In particular, the directory "PLAYLIST" includes files "xxxxx.mpls" which relate to movie playlists. A file "xxxxx.mpls" is produced for each of the movie playlists. In the file name, the "xxxxx" preceding to the period "." represents a five-digit numeral, and the "mpls" succeeding the period represents an extension fixedly applied to files of the type described.

The directory "CLIPINF" has a database of clips placed therein. In particular, the directory "CLIPINF" includes files "zzzzz.clpi" which are clip information files individually corresponding to clip AV stream files. In the file name, the "zzzzz" preceding to the period "." represents a five-digit numeral, and the "clpi" succeeding the period represents an extension fixedly applied to files of the type described.

The directory "STREAM" has AV stream files as the entity placed therein. In particular, the directory "STREAM" includes clip AV stream files individually corresponding to clip information files. A clip AV stream file is formed from a transport stream of the MPG2 (Moving Pictures Experts Group 2) (hereinafter referred to simply as MPEG2 TS) and has a file name of "zzzzz.m2ts". In the file name, the "zzzzz" preceding to the period "." is same as that of a corresponding clip information file so that the corresponding relationship between the clip information file and the clip AV stream file can be grasped readily.

The directory "AUXDATA" has placed therein a sound file, a font file, a font index file, a bitmap file and so forth which are used for menu display. The file "sound.bdmv" has placed therein sound data which relates to an interactive graphics stream application for the HDMV. The file name "sound.bdmv" is fixed. The file "aaaaa.otf" has placed therein font data which is used in caption display, the BD-J application described hereinabove, and so forth. In the file name, the "aaaaa" preceding to the period "." represents a five-digit numeral, and the "otf" succeeding the period represents an extension fixedly applied to files of the type described. The file "bdmv.fontindex" is an index file of fonts.

The directory "META" has meta data files placed therein. The directory "BDJ0" and the directory "JAR" have placed therein files which relate to BD-J objects described hereinabove. The directory "BACKUP" has placed therein backup data of the directories and files mentioned hereinabove. Since the directory "META", directory "BDJ0", directory "JAR" and directory "BACKUP" have no direct relationship to the subject matter, detailed description thereof is omitted herein.

If a disc having such a data structure as described above is loaded into a player, then it is necessary for the player to convert commands described in a movie object or the like read out from the disc into unique commands for controlling internal hardware of the player. Software for performing such conversion as just mentioned is stored in advance in a ROM (Read Only Memory) built in the player. The software is called BD virtual player because it intermediates the disc and the player to cause the player to perform action in accordance with the BD-ROM format.

Figure 7A:
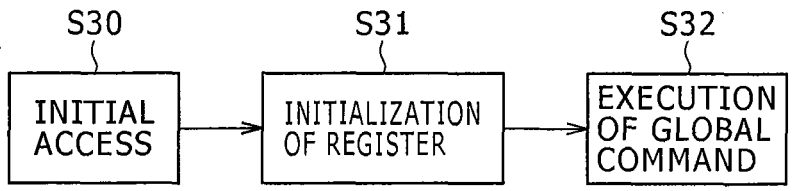
FIGS. 7A and 7B are flow diagrams illustrating action of a BD virtual player.
Figure 7B:
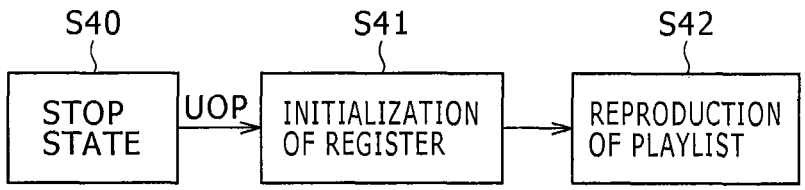

FIGS. 7A and 7B schematically illustrate action of the BD virtual player. In particular, FIG. 7A illustrates an example of action upon loading of a disc. If a disc is loaded into the player and initially accessed by the player (step S30), then registers in which common parameters to be used commonly to one disc are stored are initialized (step S31). Then at next step (step S32), a program is read in from the disc and executed. It is to be noted that the initial accessing signifies that reproduction of the disc is performed for the first time.

FIG. 7B illustrates an example of action when, for example, a play key is depressed by a user to issue a reproduction instruction while the player is in a stopping state. In the first stopping state (step S40), a reproduction instruction is issued by the user using, for example, a remote control commander (UOP: User OPeration). After the reproduction instruction is issued, the registers, that is, the common parameters, are initialized first (step S41). Then at next step S42, a playlist reproducing phase is entered. It is to be noted that alternatively the registers may be mounted such that they are not reset.

Reproduction of a playlist in the execution phase of a movie object is described with reference to FIG. 8. It is considered here that an instruction to start reproduction of a content of the title number #1 is issued through a user operation. The player refers, in response to the reproducing start instruction of a content, to the index table (Index Table) described hereinabove with reference to FIG. 2 to acquire the number of the object corresponding to content reproduction of the title #1. For example, if the number of the object for implementing the content reproduction of the title #1 is #1, then the player starts execution of the movie object #1.

Figure 8:
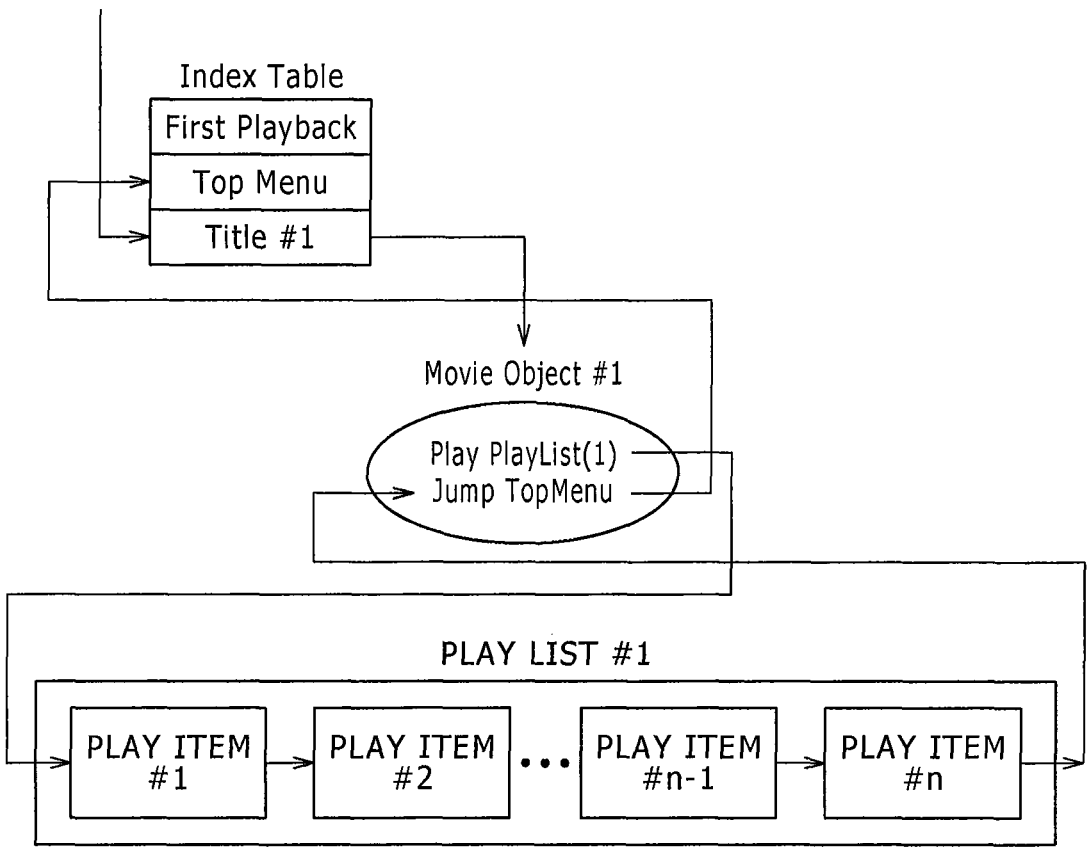
FIG. 8 is a diagrammatic view schematically illustrating action of the BD virtual player.

In the example of FIG. 8, the program described in the movie object #1 is formed from two rows, and if the command of the first row is "Play PlayList(1)", then the player starts reproduction of the playlist #1. The playlist #1 is formed from one or more play items, which are reproduced successively. After the reproduction of the play items in the playlist #1 is completed, the processing returns to the execution of the movie object #1, and the command of the second row is executed. In the example of FIG. 8, the command of the second row is "jump TopMenu", and this command is executed. Consequently, execution of a movie object for moving a top menu (Top Menu) described in the index table is started.

Figures 9, 10:
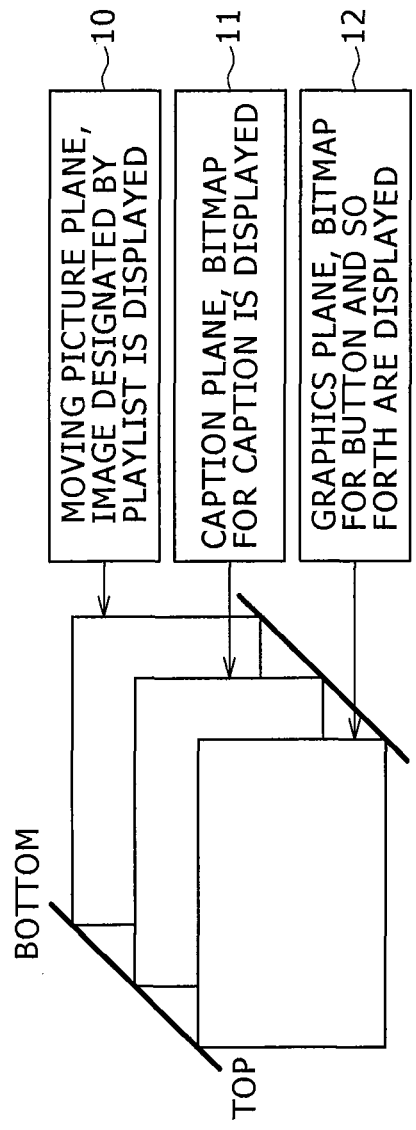
FIG. 9 is a schematic view illustrating an example of a plane structure used as a display system of an image by a reproducing system to which the present application is applied.
FIG. 10 is a view illustrating an example of a resolution and displayable colors for a moving picture plane, a caption plane and a graphics plane.

Now, a display system for an image to which embodiments can be applied is described. In the embodiments, the display system has a plane composition an example of which is shown in FIG. 9. Referring to FIG. 9, a moving picture plane 10 is displayed on the rearmost side (bottom) and handles an image (principally of moving picture data) designated by a playlist. A caption plane 11 is displayed on the moving picture plane 10 and handles caption data to be displayed during reproduction of moving pictures. A graphics plane 12 is displayed the frontmost side and handles character data for displaying a menu screen and graphics data such as bitmap data for a button image. One display screen is displayed as a combination of the three planes.

It is to be noted that the graphics plane 12 is hereinafter referred to as interactive graphics plane 12.

The moving picture plane 10, caption plane 11 and interactive graphics plane 12 can be displayed independently of one another and have such resolutions and displayable colors as seen in an example illustrated in FIG. 10. The moving picture plane 10 has a resolution of 1,920 pixels×1,080 lines and has a data length of 16 bits by conversion per one pixel. Further, the moving picture plane 10 has a color system which is composed of a luminance signal Y and color difference signals Cb and Cr of 4:2:2 (hereinafter referred to as YCbCr (4:2:2)). It is to be noted that YCbCr(4:2:2) is a color system wherein the luminance signal Y is formed from eight bits and each of the color difference signals Cb and Cr is formed from eight bits per one pixel and it is regarded that one color data is formed from two pixels of the color difference signals Cb and Cr in a horizontal direction. The interactive graphics plane 12 and the caption plane 11 have a resolution of 1,920 pixels×1,080 lines and a sampling depth of eight bits for each pixel. The color system of the interactive graphics plane 12 and the caption plane 11 has 8-bit color map addresses using a palette of 256 colors.

The interactive graphics plane 12 and the caption plane 11 allow alpha blending of 256 stages and allow setting of opacity at 256 stages upon combination with another plane. The setting of the opacity can be set for each pixel. In the following, the opacity a is represented within a range of $0 \leq \alpha \leq 1$, and the opacity $\alpha=0$ represents full transparency while the opacity $\alpha=1$ represents full opacity.

The caption plane 11 handles image data, for example, of the PNG (Portable Network Graphics) type. Also the interactive graphics plane 12 can handle image data, for example, of the PNG type. In data of the PNG type, the sampling depth of one pixel ranges from 1 bit to 16 bits, and where the sampling depth is 8 bits or 16 bits, an alpha channel, that is, opacity information (called alpha data) of each pixel component, can be added. Where the sampling depth is eight bits, the opacity can be designated at 256 stages. Alpha blending is performed using the opacity information according to the alpha channel. Further, a palette image of up to 256 colors can be used, and an index number represents what numbered element (index) of the palette prepared in advance the color is.

It is to be noted that image data handled by the caption plane 11 and the interactive graphics plane 12 are not limited to image data of the PNG type. Also image data compression coded in accordance with some other compression coding system such as the JPEG system, run length coded image data, bit map data which are not compression coded and so forth may be handled.

Figure 11:
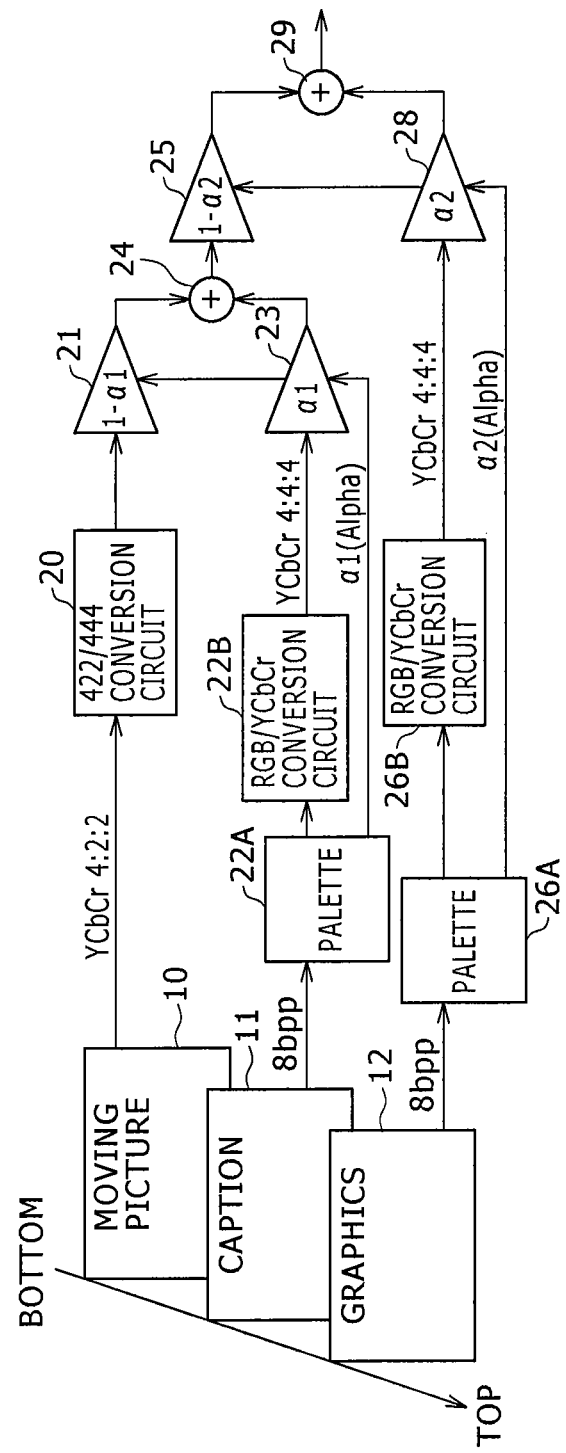
FIG. 11 is a block diagram showing an example of a composition where the moving picture plane, caption plane and graphics plane are combined.

FIG. 11 shows an example of a composition of a graphics processing section for combining the three planes in accordance with the display system described above with reference to FIGS. 9 and 10. Referring to FIG. 11, moving picture data of the moving picture plane 10 are supplied to a 422/444 conversion circuit 20. The color system of the moving picture data is converted from the YCbCr(4:2:2) system into a YCbCr (4:4:4) system by the 422/444 conversion circuit 20, and resulting moving picture are inputted to a multiplier 21.

Image data of the caption plane 11 are inputted to a palette 22A, from which they are outputted as image data of the RGB(4:4:4) system. Where an opacity by alpha blending is designated for the image data, the designated opacity $\alpha 1$ ($0 \leq \alpha \leq 1$) is outputted from the palette 22A.

FIG. 12 illustrates an example of input/output data of the palette 22A. Referring to FIG. 12, in the palette 22A, palette information corresponding to a file, for example, of the PNG system is placed as a table. The palette 22A refers to an index number thereof using image data of eight bits inputted thereto as an address. Based on the index number, RGB(4:4:4) data each formed form 8-bit data are outputted. Together with them, data a of the alpha channel representing the opacity is extracted from the palette 22A.

FIG. 13 illustrates an example of the palette table placed in the palette 22A. Referring to FIG. 13, to each of 256 color index values 0x00 to 0xFF (0x represents a hexadecimal notation), values R, G and B of the primary colors and the opacity α each represented by eight bits are allocated. The palette 22A refers to the palette table based on image data of the PNG system inputted thereto and outputs data of the colors of R, G and B (RGB data) and the opacity α in the form of 8-bit data corresponding to an index value designated by the image data for each pixel.

Referring back to FIG. 11, the RGB data outputted from the palette 22A are supplied to an RGB/YCbCr conversion circuit 22B, by which they are converted into data of a luminance signal Y and color difference signals Cb and Cr each having a data length of eight bits (such data are hereinafter referred to collectively as YCbCr data). This process is performed because it is necessary to use a common data format to perform later combination between planes, and the data are unified with YCbCr data of the data format for moving picture data.

The YCbCr data and the opacity data $\alpha 1$ outputted from the RGB/YCbCr conversion circuit 22B are inputted to a multiplier 23. The multiplier 23 multiplies the inputted YCbCr data by the opacity data $\alpha 1$. A result of the multiplication is inputted to one of input terminals of an adder 24. It is to be noted that the multiplier 23 performs multiplication of each of the luminance signal Y and the color difference signals Cb and Cr of the YCbCr data by the opacity data $\alpha 1$. Further, a complement $(1-\alpha 1)$ to the opacity data $\alpha 1$ is supplied to the multiplier 21.

The multiplier 21 multiplies moving picture data inputted from the 422/444 conversion circuit 20 by the complement $(1-\alpha 1)$ to the opacity data $\alpha 1$. A result of the multiplication is inputted to the other input terminal of the adder 24. The adder 24 adds the multiplication results of the multipliers 21 and 23. By this, the moving picture plane 10 and the caption plane 11 are combined with each other. A result of the addition of the adder 24 is inputted to a multiplier 25.

Image data of the interactive graphics plane 12 are inputted to a palette 26A, from which they are outputted as image data of the RGB(4:4:4) system. If an opacity by alpha blending is designated for the image data, then the designated opacity data $\alpha 2$ ($0 \leq \alpha 2 \leq 1$) is outputted from the palette 26A. RGB data outputted from the palette 26A are supplied to a RGB/YCbCr conversion circuit 26B, by which they are converted into YCbCr data. Consequently, the image data are unified with YCbCr data of the data format for moving picture data. The YCbCr data outputted from the RGB/YCbCr conversion circuit 26B are inputted to a multiplier 28.

Where the image data used by the interactive graphics plane 12 are of the PNG system, the opacity data $\alpha 2$ ($0 \leq \alpha 2 \leq 1$) can be set for each pixel in image data. The opacity data $\alpha 2$ is supplied to the multiplier 28. The multiplier 28 multiplies the YCbCr data inputted thereto from the RGB/YCbCr conversion circuit 26B by the opacity data $\alpha 2$ for each of the luminance signal Y and the color difference signals Cb and Cr. A result of the multiplication by the multiplier 28 is inputted to one of input terminals of an adder 29. Further a complement $(1-\alpha 2)$ to the opacity data $\alpha 2$ is supplied to the multiplier 25.

The multiplier 25 multiplies the addition result of the adder 24 by the complement $(1-\alpha 2)$ to the opacity data $\alpha 2$. A result of the multiplication by the multiplier 25 is inputted to the other input terminal of the adder 29, by which it is added to the multiplication result by the multiplier 28 described above. By this, the combination result of the moving picture plane 10 and the caption plane 11 is further combined with the interactive graphics plane 12.

If the opacity a in a region of any of the caption plane 11 and the interactive graphics plane 12 in which, for example, there is no image to be displayed is set to α=0, then another plane or planes to be displayed under the plane can be displayed in transparency. For example, moving picture data displayed on the moving picture plane 10 can be displayed as a background of the caption plane 11 and/or the interactive graphics plane 12.

It is to be noted that the composition illustrated in FIG. 11 can be implemented by any of hardware and software.

Figure 14:
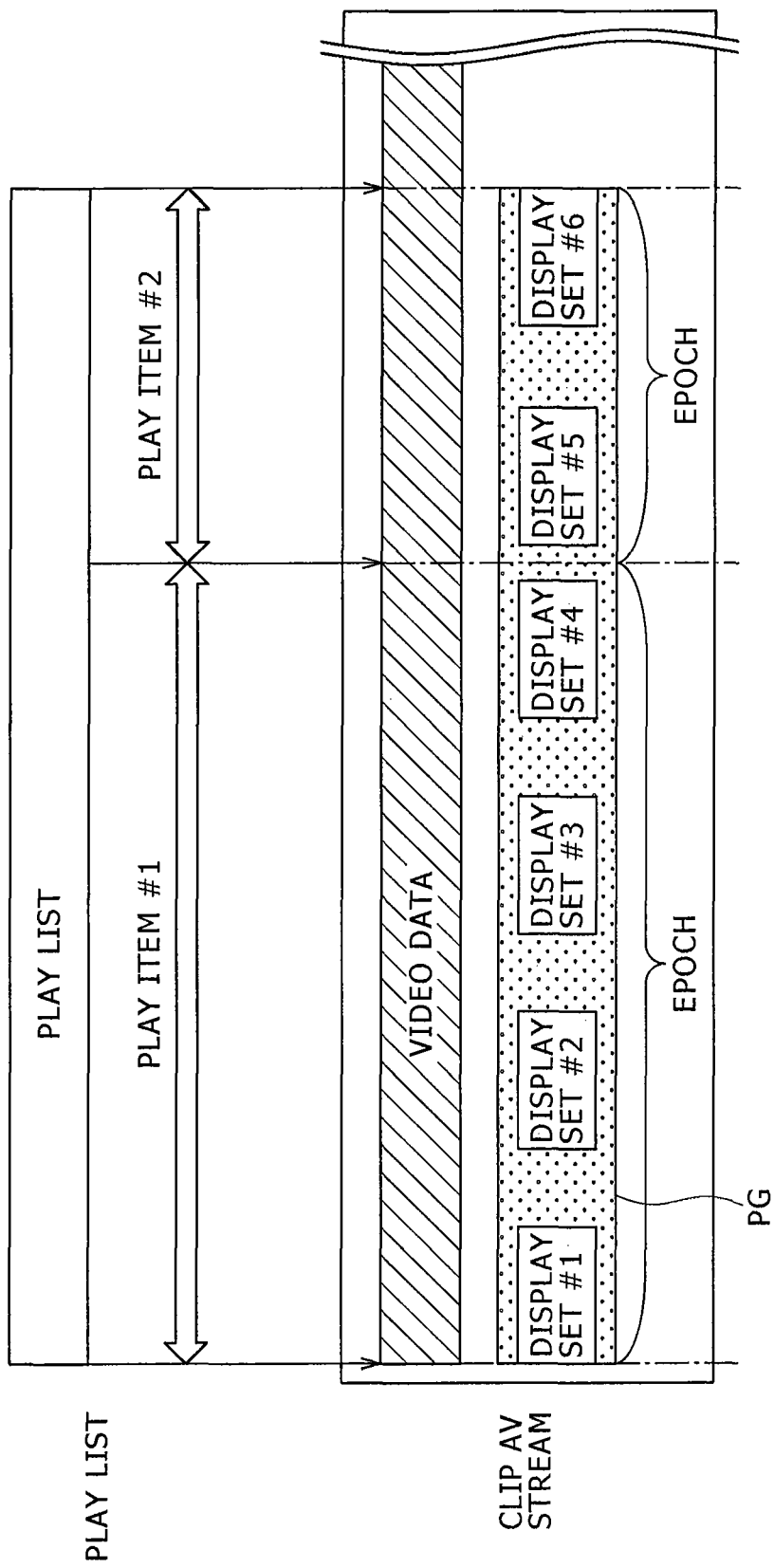
FIG. 14 is a diagrammatic view illustrating a presentation graphics stream.

Now, a presentation graphics (PG) stream is described with reference to FIG. 14. As described hereinabove, a PG stream is formed from caption image data for displaying a caption. A PG stream is included in a clip AV stream and formed from units of an epoch formed from a plurality of display sets (DisplaySet). A display set and an epoch can be compared to a picture and a GOP (Group of Pictures) defined by the MPEG2 (Moving Picture Experts Group 2), respectively.

In particular, a display set is a minimum unit for caption display and corresponds to one caption image. An epoch is formed from one or a plurality of display sets. An epoch is usually formed from units corresponding to play items. In other words, an epoch is formed from display sets for displaying a caption to be displayed during reproduction of a certain play item. A PG decoder for decoding a PG stream clears the caption plane 11 and various buffers in a unit of an epoch.

Actually, the epoch is not limited to a play item unit but may be configured arbitrarily by the authoring side. For example, an epoch is formed from a plurality of display sets for individually displaying a plurality of captions corresponding to a series of words in a movie or the like. Alternatively, for example, an epoch may be formed from a plurality of display sets each for displaying, as a caption, one of characters into which a word is separated. In other words, an epoch is a unit defined for the convenience to the authoring side but not a unit defined based on the technical ground.

FIG. 15 schematically illustrates a composition of a display set. Referring to FIG. 15, the display set includes four different types of segments of a PCS (Presentation Composition Segment), a WDS (Window Definition Segment), a PDS (Palette Definition Segment) and an ODS (Object Definition Segment). In other words, in order to display one caption, the four different segments are required. Although details are hereinafter described, the PCS has basic information of a caption placed therein. The WDS defines a display framework for displaying a caption called window. The WDS does not vary in the epoch. The PDS defines color information of the caption and includes, for example, an indexed color information table. Further, the ODS retains shape information of a caption. For example, bitmap data for displaying a caption is placed in a form compression coded by a predetermined compression coding system such as run length compression in the ODS.

FIGS. 16A to 16D schematic illustrate a logical structure relating to a display set. As seen from FIGS. 16A and 16B, four different segments of the PCS, WDS, PDS and ODS collectively form one display set. One display set is formed from a PCS, a WDS, a PDS and an ODS. In almost all cases, only one WDS exists in a display set. However, if the value of a flag palette_up_date_flag defined in the PCS described below is "1", then the WDS is optional. The PDS and the ODS are optional and may not possibly exist in a display set.

As seen in FIG. 16C, an epoch is formed from one or a plurality of display sets. Although details are hereinafter described, an epoch start display set (Epoch Start DisplaySet) can be defined in a field composition_state of the PCS. An epoch is a collection of display sets from a display set wherein an epoch start display set is defined in the PCS to another display set wherein a next epoch start display set is defined in the PCS. As seen in FIG. 16D, a presentation graphics stream (PG stream) includes one or a plurality of epochs.

FIGS. 17A to 17C illustrate an example of a placement form of such display sets as described above. As described hereinabove, a display set for displaying a caption is multiplexed as a presentation graphics stream into a clip AV stream. A display set is formed from four different segments of the PCS, WDS, PDS and ODS (FIG. 17A).

The four different segments which form a display set are distinguished from each other individually with header information as seen in FIG. 17B and are each placed in a payload of a PES (Packetized Elementary Stream) packet. Each of the four different segments is placed basically in one PES packet. Information representative of which one of the PCS, WDS, PDS and ODS the data placed in the payload is and identification information representative of an order number of the packet are placed in the PES header of each PES packet.

In the PES header, also a DTS (Decoding Time Stamp) which designates decoding time of the PES packet and a PTS (Presentation Time Stamp) which designates time at which decoded data is to be outputted are placed. Data placed in the payload of a PES packet begins to be decoded when a STC (System Time Clock) in a reference coder defined by the MPEG system coincides with the DTS. When the STC coincides with the PTS, decoded data is outputted. The PTS and the DTS are added to the PES header where the top of a predetermined access unit is included in the payload of the PES header.

Each of the PES packets is further divided into predetermined portions, each of which is filled into a transport packet of an MPEG TS (transport stream) (FIG. 17C). The order number of a transport packet, identification information for identifying data placed in the transport packet and so forth are placed in a PID (Packet Identification).

FIG. 18 illustrates syntax representative of an example of a structure of the PCD. Here, the syntax is indicated based on the description method of the C language used as a description language of a program for a computer apparatus and so forth. This similarly applies to also those figures which illustrate different syntax.

A block segment_descriptor( ) includes a field segment_type and another field segment_length (not shown). The field segment_type indicates the type of the segment. where the value of the field segment_type is "0x16", this indicates that the segment is a PCS. It is to be noted that, in descriptions of a value, "0x" indicates a hexadecimal notation. The field segment_length indicates the length of the segment later than the field segment_length.

A block video_descriptor( ) includes a field video_width, another field video_height and a further field frame_rate (not shown). The field video_width and the field video_height indicate a framework of a moving picture reproduced simultaneously with a caption which is displayed with the display set in which the PCS is included. The field frame_rate indicates a frame rate of moving pictures.

A block composition_descriptor( ) includes a field composition_number and another field composition_state (not shown). The field composition_number indicates the order number of the PCS in the epoch. The field composition_state indicates the type of the display set in which the PCS is included.

Types of the display set are described generally. For the display set, four types are defined including an epoch start display set (Epoch Start DisplaySet), an epoch continue display set (Epoch Continue DisplaySet), an acquisition point display set (Acquisition Point DisplaySet) and a normal case display set (Normal Case DisplaySet).

The epoch start display set is a display set at the top of an epoch. The epoch continue display set is used where the epoch extends across play items. For example, where an epoch extends across the play item #1 and the next play item #2, the epoch continue display set is provided at the top of the play item #2.

The acquisition point display set signifies a safe decoding start point upon decoding of a caption. In particular, if random accessing is performed on a player, the possibility is high that the accessing destination may be an intermediate portion of an epoch. Therefore, while a player successively decodes and reproduces a stream after random accessing, if it finds out an acquisition point display set, then it starts decoding of a caption from the point of the acquisition point display set to perform caption display.

The normal case display set signifies a display set which is not a safe decoding start point upon decoding of a caption. For example, where it is desirable to change the color or the shape of a caption being displayed with a different display set, a display set which describes the substance of the change is set to the normal case display set. If the player finds out the normal case display set during decoding and displaying of a caption, then it changes the color, shape or the like of the caption being currently displayed in accordance with the substance of the normal case display set.

Returning to the description of the syntax of the PCS, a field palette_update_flag represents a flag indicative of whether or not updating of a palette should be performed. Another field palette_id_ref indicates an ID of a palette to which one screen of a caption displayed based on the display set refers. In other words, the field palette_id_ref is used to refer to color information in the PDS in a PG stream.

A field number_of_composition_objects indicates the number of objects existing on one caption screen displayed based on the display set. A loop according to a succeeding for sentence is repeated by a number of times indicated by the field number_of_composition_objects, and each of the objects displayed based on the display set is defined by the block composition_object( ).

FIG. 19 illustrates syntax representative of an example of a structure of the block composition_object( ). A field object_id_ref indicates reference to the ODS to be used for caption display by the block composition_object( ). A field window_id_ref indicates an ID of a window in which an object to be used for caption display by the block_composition_object( ) is to be displayed.

A field object_cropped_flag is a flag indicative of whether or not an object to be used for caption display by the block composition_object( ) is to be cropped. In particular, the caption display can cut out a portion of a predetermined size from data of a size placed in the ODS and display the cutout portion. If the flag object_cropped_flag indicates that the object is to be cropped, then a caption cut out based on information representative of a crop size hereinafter described is displayed.

A field forced_on_flag indicates whether or not the caption display according to the block composition_object( ) is to be displayed compulsorily irrespective of a caption display on/off instruction by a user operation.

A field composition_object_horizontal_position and another field compositiojn_oject_vertical_position indicate a horizontal position and a vertical position, respectively, of the caption display by the block composition_object( ) on the screen. The horizontal position and the vertical position are indicated by relative positions, for example, with respect to position information of a window indicated by the WDS hereinafter described.

If the value of the flag indicated by the field object_cropped_flag described hereinabove indicates that the object is to be cropped, then succeeding descriptions beginning with if (object_cropped_flag==1b) are executed to designate a position and a size from and with which the caption is to be cut out. In particular, the horizontal position and the vertical position of the origin for cutting out are indicated by a field object_cropping_horizontal_position and another field object_cropping_vertical_position in a block cropping_rectangle( ), respectively, and the width and the height for cutting out are indicated by a further field object_cropping_width and a still further field object_cropping_height, respectively.

FIG. 20 illustrates syntax representative of an example of a structure of the WDS. Referring to FIG. 20, a block segment_descriptor( ) includes a field segment_type and another field segment_length (not shown). The field segment_type indicates a type of the segment. Where the value of the field segment_type is "0x17", this indicates that the segment is a WDS. The field segment_length indicates the length of the segment later than the field segment_length.

A further field number_of_windows indicates the number of windows which exist on one caption screen displayed according to the display set in which the WDS is included. A loop according to a succeeding for sentence is repeated by a number of times indicated by the field number_of_windows, and each of the windows is defined by a block window( ).

FIG. 21 illustrates syntax representative of an example of a structure of the block window( ). A field window_id indicates an ID of the window. Another field window_horizontal_position and a further field window_vertical_position indicate a horizontal position and a vertical position of the window with respect to the origin of the screen, respectively. A still further field window_width and a yet further field window_height indicate the width and the height of the window, respectively.

Figure 22:
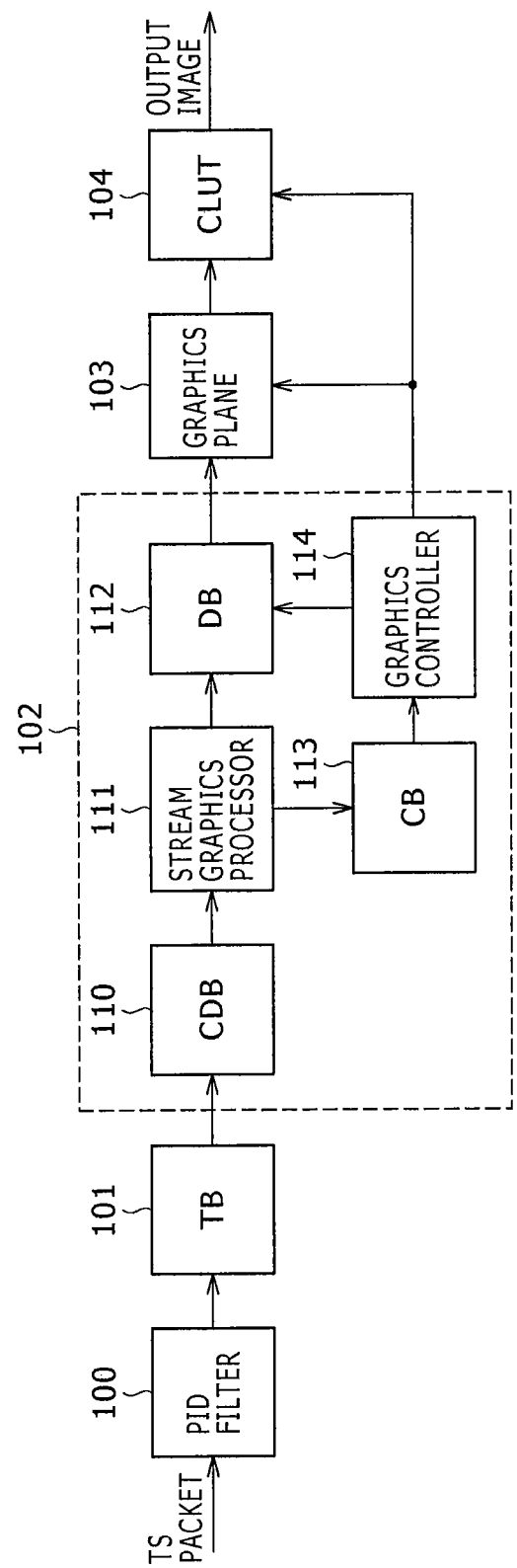
FIG. 22 is a block diagram showing an example of a composition of a decoder model of presentation graphics data defined in the BD-ROM format at the present point of time.

Now, a decoder model for presentation graphics data defined in the BD-ROM format at the present point of time is described with reference to FIG. 22. In the decoder model shown, a presentation graphics stream is supplied in the form of TS packets. The TS packets are supplied to a PID filter 100, by which PID is analyzed to select those TS packets in which presentation graphics data are placed. The thus selected TS packets are accumulated into a transport buffer (TB) 101. Then, data placed in the payload of each of the TS packets is extracted on the transport buffer 101, and a PES packet is re-constructed based on the PID. In other words, at this stage, the segments PCS, WDS, PDS and ODS which have been disintegrated in the TS packets are integrated.

The PES packet formed from segments is supplied to a presentation graphics decoder (PG decoder) 102 and placed into a coded data buffer (CDB) 110 once. Then, if a DTS defined in the PES packet based on the STC is reached, then the PES packet is read out from the CDB 110 and transferred to a stream graphics processor 111, by which it is decoded individually. The decoding by the stream graphics processor 111 signifies that the segment placed in the PES packet is placed into an available state. For example, the stream graphics processor 111 develops the PES packet and extracts the segment PCS, WDS, PDS and ODS placed in the payload of the PES packet.

The stream graphics processor 111 places the segments, whose decoding is completed, into a decoded object buffer (DB) 112 or a composition buffer CB 113. In particular, the stream graphics processor 111 places shape information (referred to as object) of a caption decoded from the ODS in one epoch at the timing of the DTS into the DB 112. Further, the stream graphics processor 111 places the PCS and the WDS, whose decoding is completed, into the CB 113 at the timing of the DTS. Further, since the PDS defines only the PTS, the PDS whose decoding is completed is placed into the CB 113 at the timing of the PTS.

Here, the CB 113 can retain up to a predetermine number of, for example, eight, PCS and PDS segments which are in a valid state. In the PCS and PDS segments, a portion from a defined DTS to a defined PTS are rendered valid. A PCS which is placed out of a valid state is abandoned from the CB 113, for example, for the preparation for a PCS to be supplied next. The abandoning is performed, for example, by erasing the PCS from the CB 113. However, the abandoning is not limited to this, but otherwise the PCS may be placed into a disabled state such that next data may be overwritten on the PCS.

The PCS segments placed in the CB 113 are discharged one by one at timings of the PTS segments defined in the PCS segments. It is to be noted that a PDS and an ODS which are referred to by a PCS which is in a valid state cannot be exchanged for another PDS or ODS. Here, the supplying destination of the segments discharged from the CB 113 is not prescribed in the BD-ROM format.

A graphics controller 114 controls segments of presentation graphics data. For example, the graphics controller 114 reads out a PCS from the CB 113 at the timing of a PTS defined in the PCS and reads out WDS and PDS segments which are referred to by the PCS. Further, the graphics controller 114 reads out an ODS referred to by the PCS from the DB 112. Then, the graphics controller 114 decodes the read out PCS and WDS segments and the ODS segments to form data for displaying a caption and writes the data into a graphics plane 103. The PCS segments read out from the CB 113 are abandoned from the CB 113.

It is to be noted that data which are formed by decoding the PCS and WDS segments and the ODS segments described hereinabove for displaying a caption are, for example, bitmap data having coordinate information. In the following description, data for displaying a caption is referred to as caption image. The caption image is data which has shape information and position information but does not have color information.

Further, the graphics controller 114 decodes the PDS segments read out from the CB 113 to form, for example, such a color palette table as described hereinabove with reference to FIG. 13 and writes the color palette table into a CLUT 104.

The caption image written in the graphics plane 103 is read out at a predetermined timing, for example, at a frame timing, and color information acquired by referring to the color palette table of the CLUT 104 is added to the caption image to form output caption image data. The output caption image data formed is outputted. Depending upon the specifications of the player, caption image data formed by adding color information based on the color palette table of the CLUT 104 to the data read out from the graphics plane 103 may be further written into a frame memory.

It is to be noted that the buffers and the planes are cleared in response to updating of the epoch. If the description in the field composition_state in the block composition_descriptor( ) of the PCS read out from the CDB 110 and decoded indicates that the display set is an epoch start display set, then, for example, the DB 112, CB 113, graphics plane 103 and CLUT 104 are cleared by the graphics controller 114.

Figure 23:
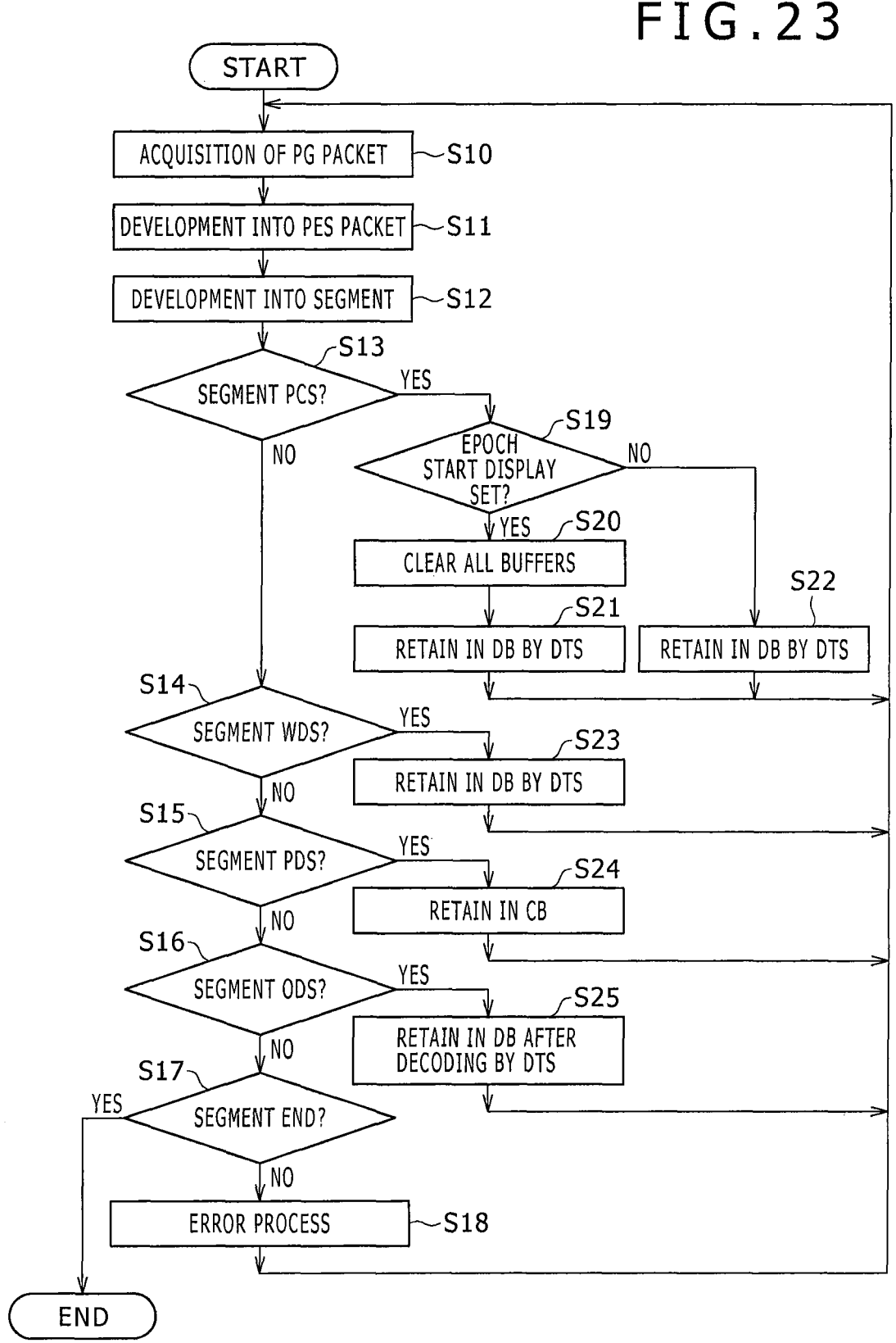
FIG. 23 is a flow chart illustrating an example of a process in a unit of a display set of the presentation graphics decoder.

FIG. 23 illustrates an example of a process in a unit of a display set by the PG decoder 102. Referring to FIG. 23, at step S10, the PID filter 100 acquires a packet in which presentation graphics data is placed based on a PID from a TS packet and cumulatively stores the packet into the transport buffer 101. Then at step S11, the TS packet is transferred from the transport buffer 101 to the CDB 110, by which data is extracted from the payload of the TS packet based on the PID to re-construct the PES packet.

The PES packet is developed into a segment by the stream graphics processor 111. Then at steps S13 to S17, it is decided whether the segment developed is one of the PCS, WDS, PDS and ODS or an END segment. Then, a process corresponding to a result of the decision is performed. The type of the segment can be decided based on the first field segment_type of the block segment_descriptor( ) at the top of the syntax as described hereinabove with reference to FIG. 18 or 20. It is to be noted that the type of the segment also of the WDS and the ODS not shown can be decided by a similar method.

At step S13, it is decided whether or not the segment is a PCS. If it is decided that the segment is a PCS, then the processing advances to step S19. At step S19, it is decided based on the field composition_state in the block composition_descriptor( ) of the syntax of the PCS described hereinabove with reference to FIG. 18 is an epoch start display set.

If it is decided that the display set is an epoch start display set, then the processing advances to step S20, at which the buffers relating to caption display are cleared. For example, the DB 112 and the CB 113 are cleared at step S20. Then at next step S21, the PCS is written into the thus cleared CB 113 at the timing of the DTS. After the writing of the PCS into the CB 113 is completed, the processing returns to step 510 so that another packet is acquired.

On the other hand, if it is decided that the PCS is not an epoch start display set, then the processing advances to step S22, at which the PCS is written into the CB 113 at the timing of the DTS. At this time, the PCS is written into a free region of the CB 113.

On the other hand, if it is decided at step S13 that the segment is not a PCS, then the processing advances to step S14, at which it is decided whether or not the segment is a WDS. If it is decided that the segment is a WDS, then the processing advances to step S23, at which the WDS is written into the CB 113 at the timing of the DTS. After the writing of the WDS into the CB 113 is completed, the processing returns to step S10 so that another packet is acquired. If it is decided at step S14 that the segment is not a WDS, then the processing advances to step S15.

A step S15, it is decided whether or not the segment is a PDS. If it is decided that the segment is a PDS, then the processing advances to step S24, at which the PDS is written immediately into the CB 113. Since the PDS includes only a PTS defined therein but does not include a DTS, at a point of time at which it is decided that the segment is a PDS, it is written into the CB 113 immediately. After the writing of the WDS into the CB 113, the processing returns to step S10 so that another packet is acquired. If it is decided at step S15 that the segment is not a PDS, then the processing advances to step S16.

At step S16, it is decided whether or not the segment is an ODS. If it is decided that the segment is an ODS, then the processing advances to step S25, at which run length processed bitmap data placed in the ODS is decoded at the timing of the DTS and written into the DB 112. After the writing of the ODS into the DB 112 is completed, the processing returns to step S10 so that another packet is acquired. If it is decided at step S16 that the segment is not an ODS, then the processing advances to step S17.

At step S17, it is decided whether or not the segment is an END segment indicative of the tail end of the display set. If the segment is an END segment, then the series of processes relating to the display set is completed.

On the other hand, if it is decided at step S17 that the segment is not an END segment, then the processing advances to step S18. In this instance, it can be decided that some error has occurred, and a predetermined error process is performed at step S18.

In the composition described above, at the timing of the PTS defined by the PCS, the PCS to be used to display a caption is discharged to display a caption and is simultaneously abandoned from the CB 113. Therefore, if a caption display off instruction is issued through a user operation and the caption is erased, then even if a caption display on instruction is issued subsequently to try to display the caption again, the caption cannot be displayed until the PTS defined in the PCS after the issuance of the caption display on instruction is reached.

Now, a first embodiment is described. In the first embodiment, a currently active ODS is retained in a buffer provided separately from the DB 112 while currently active PCS and PDS are retained in buffers provided separately from the CB 113. If a caption display on instruction is issued, then the ODS, PCS and PDS retained in the buffers provided separately from the DB 112 and the CB 113 are used to form a caption image and a color palette table. Then, the caption image and the color palette table are written into the graphics plane 103 and the CLUT 104, respectively.

It is to be noted that the term active is used to represent a state wherein a displaying instruction is provided by the PTS. More particularly, in a certain PCS, a period from a PTS defined in the PCS itself to a PDS defined in another PCS which is used for next caption display is kept active.

In particular, the graphics controller 114 supplies a PCS discharged from the CB 113 at the timing of the PTS defined for each PCS to the graphics plane 103 and the CLUT 104 as described above and retains the PCS in the buffer provided separately from the CB 113 till the timing of the PTS defined in a next PCS. Also as regards an ODS, the graphics controller 114 supplies an ODS discharged at the timing of the PTS from the DB 112 to the graphics plane 103 and retains the ODS in the buffer provided separately from the DB 112 till the timing of the PTS defined in a next PCS.

According to the composition described above, if a caption display on instruction is issued after a caption is erased in response to a caption display off instruction issued through a user operation, the caption can be immediately displayed in response to a timing of a caption display on instruction.

In other words, if a caption display on instruction is issued after a caption is erased, an PCS is read out from the buffer provided separately from the DB 113 as well as an ODS is read out from the buffer provided separately from the DB 112. Then, the PCS and the ODS read out in this manner are used to form a caption image. Also as regards a PDS, a PDS is read out from the buffer provided separately from the CB 113 at a timing of a caption display on instruction and the PDS read out in this manner is used to form a color palette table similarly. The color palette table formed in this manner is written into the CLUT 104.

Figure 24:
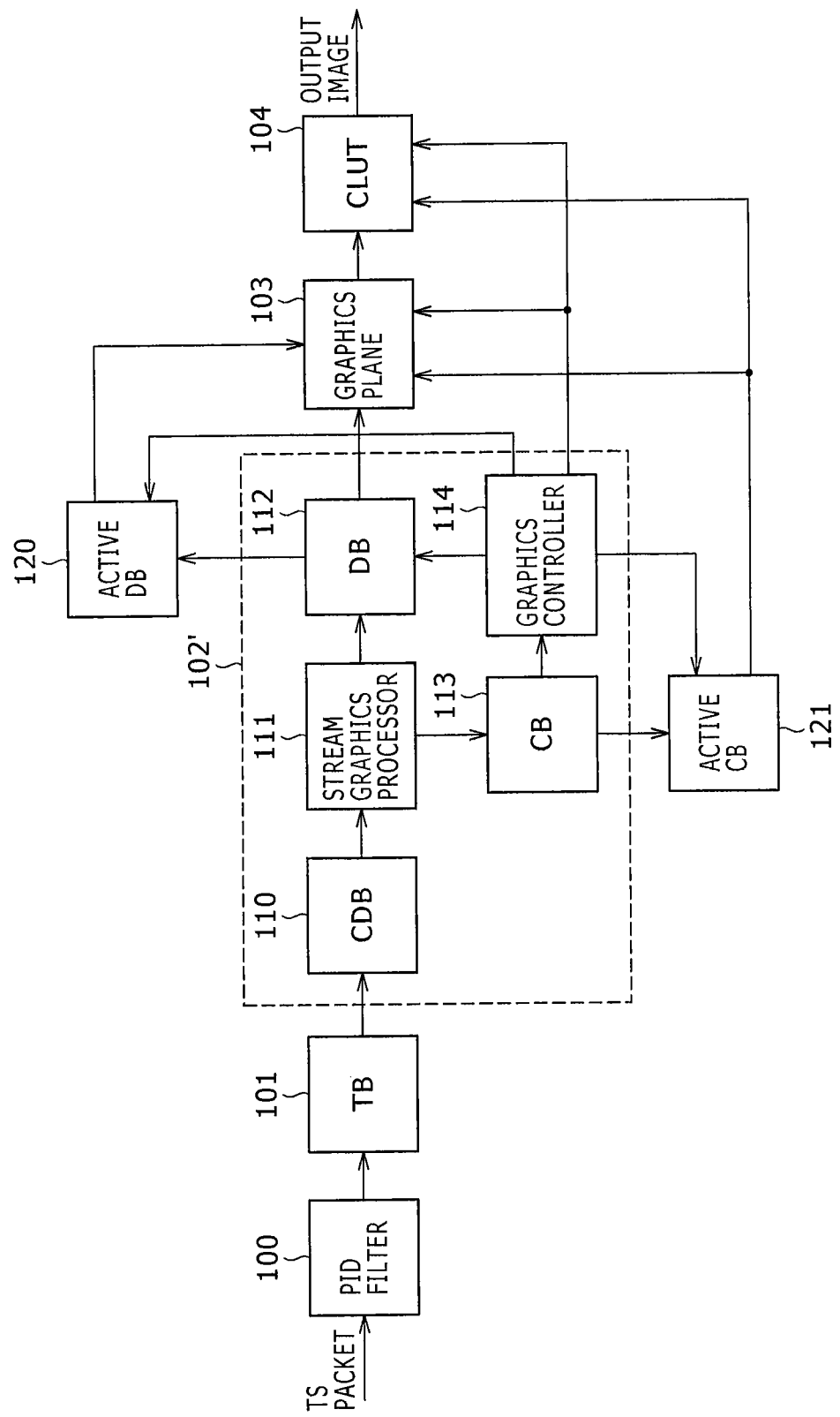
FIG. 24 is a block diagram showing an example of a decoder model for presentation graphics data according to a first embodiment.

FIG. 24 shows a decoder model of an example of a presentation graphics decoder according to the first embodiment. The decoder model according to the first embodiment has a composition similar to but is different from that of FIG. 22 in that it additionally includes an active decoded buffer (DB) 120 and an active composition buffer (CB) 121. It is to be noted that, in FIG. 24, each similar component to the component described in FIG. 22 has the same reference number and detailed description is omitted. In addition, the process for each display set by the PG decoder 102' is performed similarly to that described hereinabove with reference to FIG. 23.

Also in the PG decoder 102' according to the first embodiment, the graphics controller 114 reads out a PCS from the CB 113 at the timing of the PDS defined in the PCS and reads out a WDS and a PDS referred to by the PCS from the CB 113. The PCS read out from the CB 113 is abandoned from the CB 113. Further, the ODS referred to from the PCS is read out from the DB 112. Based on the segment read out at the timing of the PTS defined in the PCS, the graphics controller 114 forms a caption image for the graphics plane 103 and supplies the color palette table to the CLUT 104.

When the PCS is read out from the CB 113, the graphics controller 114 stores the read out PCS into the active CB 121 and stores also the PDS, which is referred to by the PCS, into the active CB 121. Similarly, the graphics controller 114 reads out an ODS from the DB 112 and stores the read out ODS into the active DB 120.

The PCS and PDS and the ODS stored in the active CB 121 and the active DB 120, respectively, are retained till the timing of the PTS defined in the PCS used next to the PCS stored in the active CB 121 or until the epoch is updated.

If a caption display on instruction is issued through a user operation, then the graphics controller 114 uses the PCS stored in the active CB 121 and the ODS stored in the active DB 120 to form a caption image and writes the caption image on the graphics plane 103. Further, the graphics controller 114 reads out the PDS stored in the active CB 121 and supplies the PDS to the CLUT 104.

Consequently, a caption image based on the PCS and the PDS stored in the active CB 121 and the ODS stored in the active DB 120 is displayed on the screen. Accordingly, if, while a caption according to a certain caption is displayed, a caption display off instruction is issued and then a caption image on instruction is issued on the screen in response to user operations, then the caption display can be resumed immediately at the timing of the caption image on instruction.

It is to be noted that, while the active DB 120 and the active CB 121 are shown as buffers independent of each other in FIG. 24, they need not be independent buffers but may be formed otherwise as different regions of a single buffer.

Figure 25:
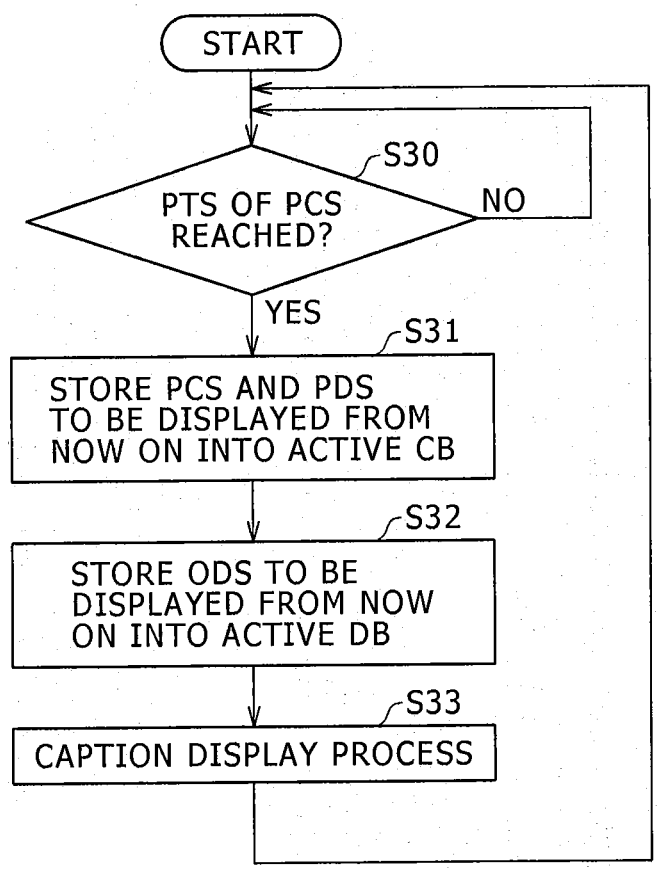
FIG. 25 is a flow chart illustrating an example of a process by a graphics controller of the decoder model of FIG. 24.
Figure 26:
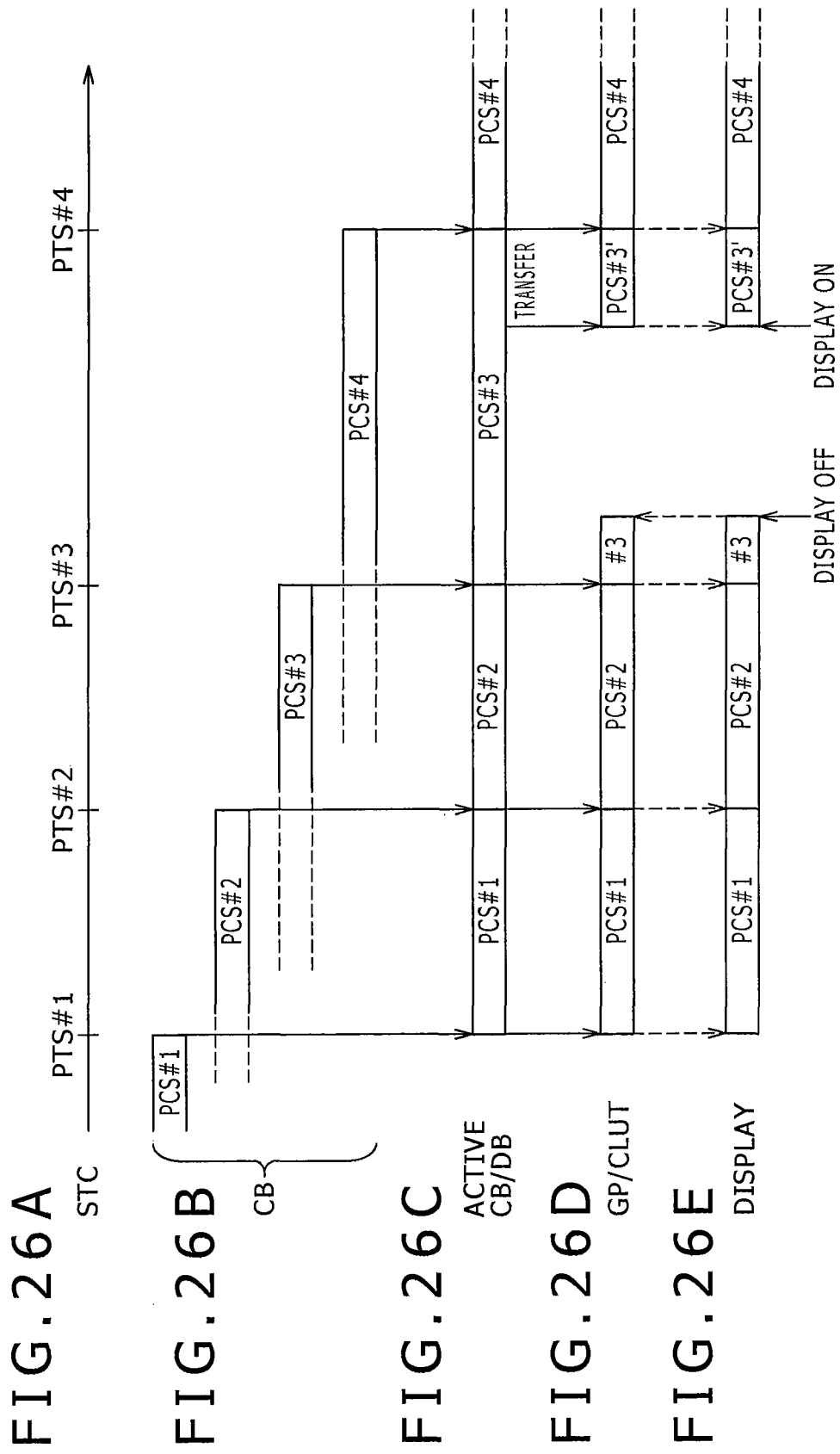
FIGS. 26A to 26E are diagrammatic views schematically illustrating transition of segments in caption image display.
Figure 27:
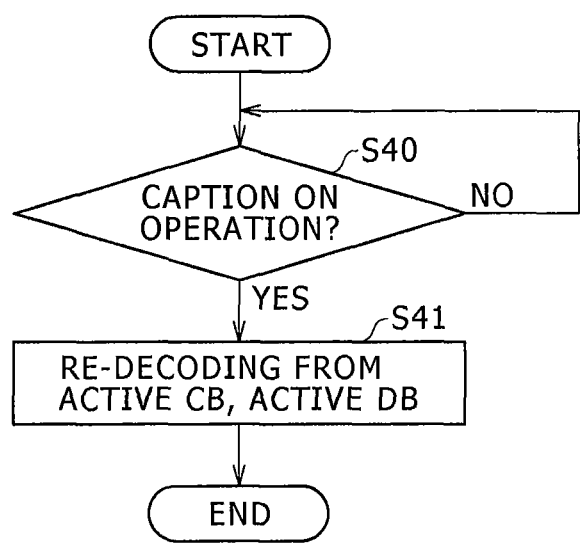
FIG. 27 is a flow chart illustrating an example of a process where a caption display on instruction is issued through a user operation.

Now, the display process of a caption image according to the first embodiment is described in detail with reference to FIGS. 25 to 27. FIG. 25 illustrates an example of a process of the graphics controller 114 according to the first embodiment. The graphics controller 114 first decides, based on time information (STC), whether or not there exists, among PCS segments stored in the CB 113, that PCS whose PTS reaches defined time (step S30). If it is decided that there exists a PCS whose PTS reaches defined time, then the processing advances to step S31.

At step S31, the PCS to be used for a caption to be displayed from now on, that is, the PCS whose PTS reaches defined time at step S30 and the PDS referred to from the PCS are stored into the active CB 121. Then at next step S32, an ODS to be used in a caption image to be displayed from now on, that is, the ODS referred to from the PCS stored into the active CB 121 at step S31, is stored into the active DB 120.

After the storage of the PCS and PDS and the ODS into the active CB 121 and the active DB 120, respectively, is completed, then the processing advances to step S33, at which a display process of the caption image is performed. In particular, at step S33, a caption image is formed from the PCS and the PDS stored in the CB 113 and the ODS stored in the DB 112 and is displayed. After the display process of the caption image, the processing returns to step S30 so that the processes at steps S30 to S33 are performed with regard to a PTS defined by the next PCS.

More detailed description is given with reference to FIGS. 26A to 26E which generally illustrate transition of segments upon caption image display. It is to be noted that, in FIGS. 26A to 26E, PCS segments are displayed as representative ones of segments which form a display set. FIG. 26A shows a STC, and FIG. 26B shows PCS segments stored in the CB 113. FIG. 26C shows PCS segments stored in the active CB 121. Into the active DB 120, an ODS which is referred to by the PCS stored in the active CB 121 is stored. FIG. 26D shows caption images written on the graphics plane 103 and PCS segments corresponding to PDS segments supplied to the CLUT 104. FIG. 26E shows PCS segments corresponding to actual caption display.

It is assumed that, as seen from FIGS. 26A and 26B, PTS segments PTS#1, PTS#2, PTS#3 and PTS#4 are defined by PCS segments PCS#1, PCS#2, PCS#3 and PCS#4, respectively. The PCS segments PCS#1, PCS#2, PCS#3 and PCS#4 stored in the CB 113 are read out into the graphics controller 114 in accordance with the respective PTS segments defined therein.

For example, if the time reaches the PTS segment PTS#2 based on the STC (step S30), then the PCS segment PCS#2 defined as a PTS segment in the PTS segment PTS#2 and a PDS referred to by the PCS segment PCS#2 are read out from the CB 113 by the graphics controller 114 (FIG. 26B) and stored into the active CB 121 at step S31 (FIG. 26C). Further, at step S32, an ODS referred to by the PCS segment PCS#2 is read out from the DB 112 and stored into the active DB 120.

Then, by the caption display process at step S33, a caption image is formed based on the PCS segment PCS#2 read out from the CB 113 and the ODS segment read out from the DB 112 by the graphics controller 114 and is written into the graphics plane 103. The PCS segment PCS#2 read out from the CB 113 is abandoned from the CB 113. Meanwhile, the PDS read out from the CB 113 is supplied to the CLUT 104 to form a color palette table (FIG. 26D). A caption image based on the PCS segment PCS#2 is displayed based on the display image written on the graphics plane 103 and the PDS supplied to the CLUT 104 (FIG. 26E).

It is to be noted that the substances of the active DB 120 and the active CB 121 are successively rewritten with PCS, PDS and ODS segments to be used for next caption image display.

Now, a process where a caption display on instruction is issued in response to a user operation is described. Referring to FIG. 27 which illustrates an example of the process, if a caption display on instruction is issued through a user operation (step S40), then a PCS segment stored in the active CB 121 and an ODS segment stored in the active DB 120 are read out from the graphics controller 114 at step S41. The read out PCS and ODS are decoded into a caption image, which is written into the graphics plane 103. Together with this, a PDS is read out from the active CB 121 to form a color palette table, which is supplied to the CLUT 104.

The process described is described more particularly with reference to FIGS. 26A to 26E. For example, at the timing of the PTS segment PTE#3, the PCS segment PCS#3 in which the PTS segment PTS#3 is defined is stored into the active CB 121 (FIG. 26C) and a caption image based on the PCS segment PCS#3 is displayed (FIGS. 26D and 26E). Together with this, the PCS segment PCS#3 is abandoned from the CB 113.

If, in this state, a caption display off instruction is issued through a user operation ("display off" in FIG. 26E), then the caption based on the PCS segment PCS#3 is erased. For example, a region in which the caption image is displayed based on the WDS segment is rewritten with data having a transparent attribute to erase the caption. At this time, the PCS segment PCS#3 corresponding to the erased screen has been abandoned already from the CB 113.

Then, if a caption display on instruction is issued through a user operation ("display on" in FIG. 26E), then the PCS segment stored in the active CB 121 (in the example of FIG. 26C, the segment PCS#3) and the PDS referred to by the PCS are read out. Then, a caption image is re-formed based on the read out PCS and written on the graphics plane 103, and the PDS segment is supplied to the CLUT 104. Consequently, the caption display can be resumed in response to a user operation.

It is to be noted that, in the example of FIGS. 26A to 26E, after a caption display off instruction is issued in response to a user operation, a caption display on instruction is issued before caption display based on a next PCS segment is started. However, caption display can naturally be resumed similarly also when a caption display on instruction is issued after PTS segments according to a plurality of PCS segments pass after a caption display off instruction is issued.

In particular, also after a caption display off instruction is issued, reading out of PCS and PDS segments from the CB 113 at the timing of the PTS, reading out of an ODS segment from the DB 112, storage of the PCS and PDS segments read out from the CB 113 into the active CB 121 and storage of the ODS segment read out from the DB 112 into the active DB 120 are performed successively. Accordingly, when a caption display on instruction is issued in response to a user operation, the PCS and PDS segments stored in the active CB 121 and the ODS segment stored in the active DB 120 can be used to display a caption to be displayed at the timing of the caption display on instruction.

Further, in the foregoing description, when a caption display on instruction is issued after a caption instruction off instruction is issued in response to a user operation, a caption image display process is performed using the PCS and PDS segments stored in the active CB 121 and the ODS segment stored in the active DB 120. However, the caption image display process may not be performed at the timing mentioned. In particular, as an actual process, only it is necessary for a process to be defined for a caption display on instruction.

Further, in the foregoing description, an ODS segment read out from the DB 112 and PCS and PDS segments read out from the CB 113 are normally written into and retained in the active DB 120 and the active CB 121, respectively, irrespective of whether or not a caption display on/off instruction is issued in response to a user operation. However, the writing and retaining action is not limited to this, but otherwise, for example, only when a caption display off instruction is issued in response to a user operation, writing and retaining of data into and in the active DB 120 and the active CB 121 may be performed. However, in this instance, after a caption display off instruction is issued, if a caption display on instruction is issued prior to the PTS segment defined in a next PCS segment, then a caption is not displayed before the PTS segment defined in the next PCS segment is reached.

Now, a second embodiment is described. In the first embodiment described hereinabove, PCS, PDS and ODS segments at a stage prior to formation of a caption image are retained in buffers. However, in the second embodiment, the substances of the graphics plane 103 and the CLUT 104 are retained in respective buffers. When a caption display on instruction is issued in response to a user operation, the data retained in the buffers are written into the graphics plane 103 and the CLUT 104. Consequently, when a caption display on instruction is issued after a caption display off instruction is issued in response to a user operation, the caption to be displayed at the timing of the caption display on can be displayed immediately.

Figure 28:
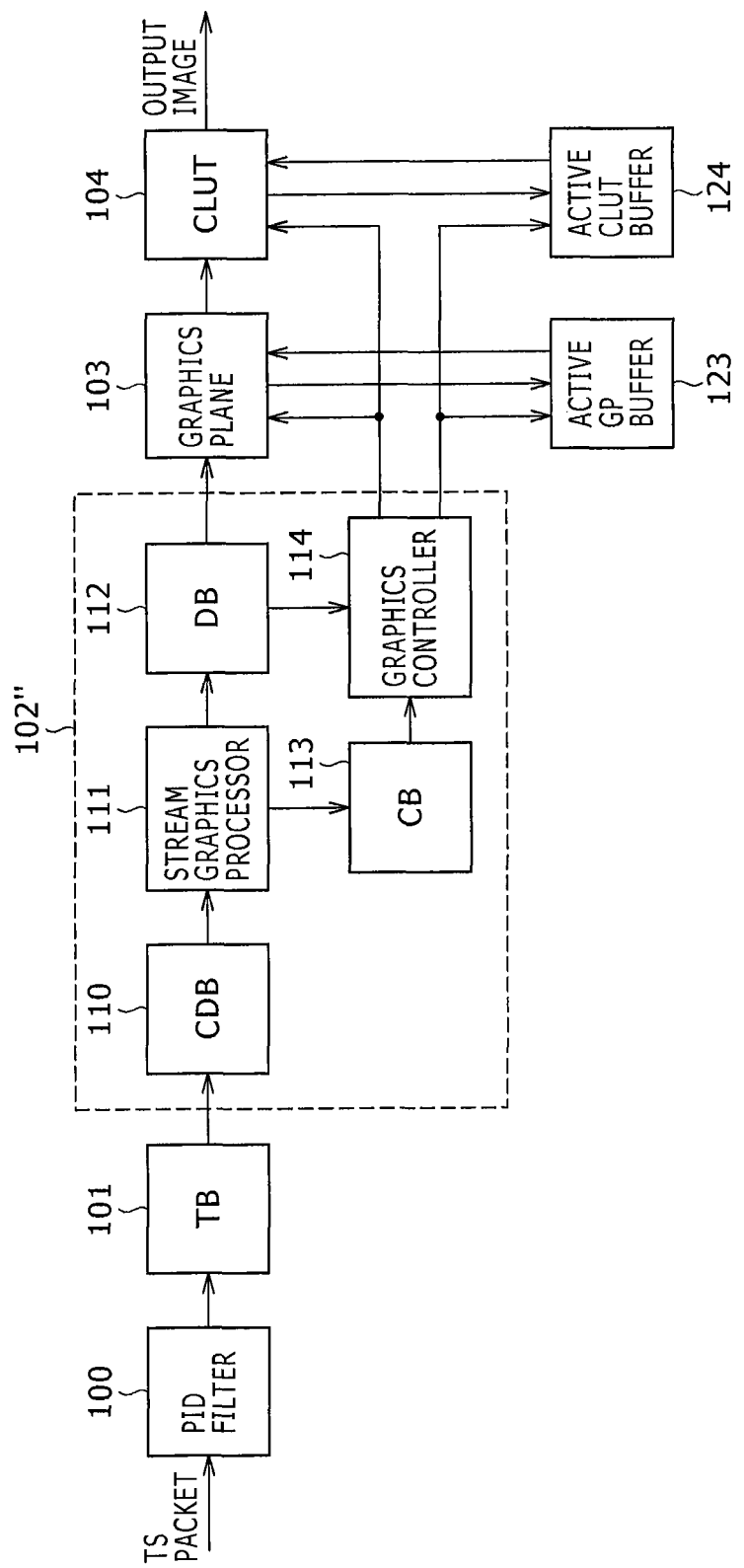
FIG. 28 is a block diagram showing an example of a composition of a decoder model for presentation graphics data according to a second embodiment.

FIG. 28 shows an example of a decoder model for presentation graphics data according to the second embodiment. The decoder model according to the second embodiment has a composition similar to but is different from that of the decoder model of the composition described hereinabove with reference to FIG. 22 that it additionally includes an active GP buffer 123 and an active CLUT buffer 124. It is to be noted that, in FIG. 28, each similar component to the component described in FIG. 22 has the same reference number and detailed description is omitted. In addition, the process for each display set by the PG decoder 102" is performed similarly to that in the first embodiment described hereinabove with reference to FIG. 23.

According to the composition shown in FIG. 28, data to be written on the graphics plane 103 are written also into the active GP buffer 123 under the control of the graphics controller 114 of the PG decoder 102". Similarly, a color palette table of the CLUT 104 is written also into the active CLUT buffer 124 under the control of the graphics controller 114. Then, if a caption display on instruction is issued in response to a user operation, then the graphics controller 114 writes the data written in the active GP buffer 123 also into the graphics plane 103 and writes the data written in the active CLUT buffer 124 into the CLUT 104.

It is to be noted that, while the active GP buffer 123 and the active CLUT buffer 124 are shown as buffers independent of each other in FIG. 28, they need not be independent buffers but may be formed otherwise as different regions of a single buffer.

The data stored in the active GP buffer 123 and the color palette table stored in the active CLUT buffer 124 are retained till the timing of a PTS defined in a PCS to be used next to the PCS displayed currently (PCS corresponding to the data and the color palette table) or until the epoch is updated.

Figure 29:
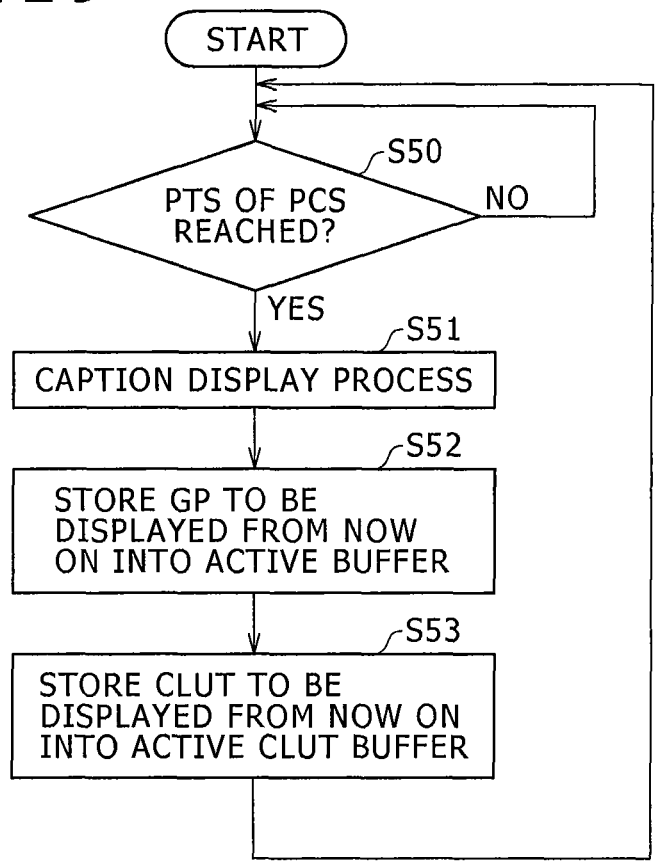
FIG. 29 is a flow chart illustrating an example of a process of a graphics controller of the decoder model of FIG. 28.

FIG. 29 illustrates an example of a process of the graphics controller 114 according to the second embodiment. Referring to FIG. 29, the graphics controller 114 decides, based on time information (STC), whether or not a PCS segment wherein the PTS in which time is defined is reached exists from among PCS segments stored in the CB 113 (step S50). If a PCS wherein the time reaches the PTS exists, then the processing advances to step S51.

At step S51, a display process for a caption image is performed. In particular, the PCS and ODS segments are read out from the CB 113 and the DB 112, respectively, and decoded to form a caption image, which is written into the graphics plane 103. Further, the PDS segment stored in the CB 113 is decoded to form a color palette table, which is written into the CLUT 104.

At next step S52, data to be displayed subsequently on the graphics plane 103 is written into the active GP buffer 123. In other words, the caption image written in the graphics plane 103 is written into the active GP buffer 123.

At step S53, the color palette table in the CLUT 104 which is to be used for display now is written into the active CLUT buffer 124. In particular, the color palette table written into the CLUT 104 at step S51 is written into the active CLUT buffer 124.

After writing of the data of the graphics plane 103 into the active GP buffer 123 and writing of the data of the CLUT 104 into the active CLUT buffer 124 are completed, the processing returns to step S50 so that the processes at steps S50 to S53 are performed with regard to the PTS defined in the next PCS.

Figure 30:
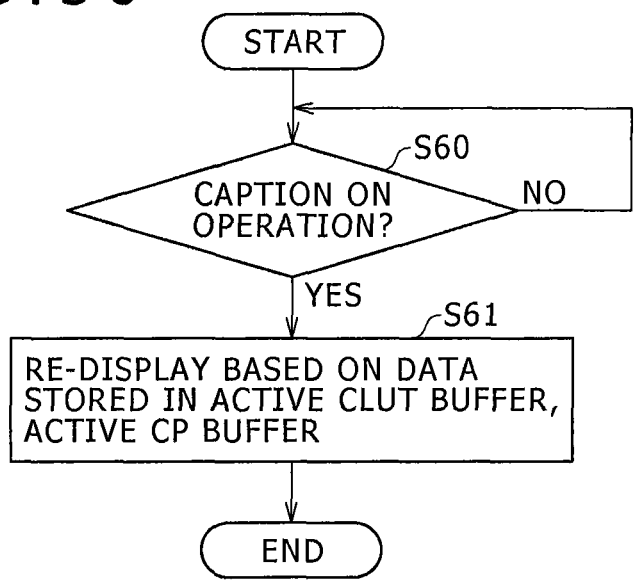
FIG. 30 is a flow chart illustrating an example of a process of the decoder model of FIG. 28 where a character display on instruction is issued through a user operation.
Figure 33A:
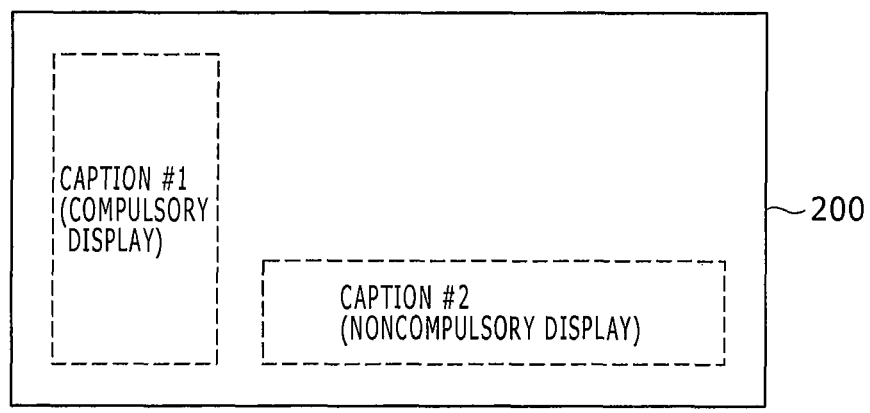
FIGS. 33A and 33B are schematic views illustrating a process where two different caption images are displayed on a screen.
Figure 33B:
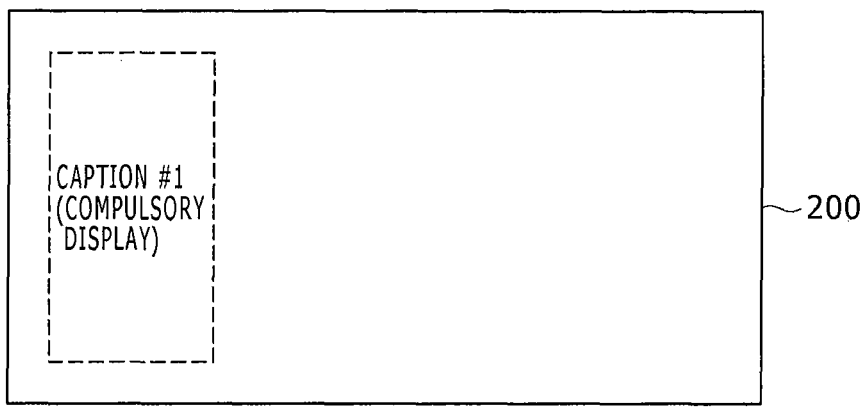

A process when a caption display on instruction is issued in response to a user operation is described below. FIG. 30 illustrates an example of the process mentioned. Referring to FIG. 30, if a caption display on instruction is issued in response to a user operation (step S60), then display is performed based on data stored in the active GP buffer 123 and the active CLUT buffer 124 at step S61. For example, at step S61, a caption image stored in the active GP buffer 123 is written into the graphics plane 103, and a color palette table stored in the active CLUT buffer 124 is written into the CLUT 104.

According to the second embodiment described above, since data after decoding are retained in the buffers, there is an advantage that the processing is easy when compared with the method wherein data before decoding are retained according to the first embodiment described hereinabove.

On the other hand, in the present second embodiment, since data after decoding are retained in the buffers, a greater capacity is required for the buffers when compared with the first embodiment. For example, in the first embodiment described hereinabove, only a capacity of 256 kB (kilobytes) sufficient to store at least four segments having a data amount of 64 kB in the maximum is required for the active DB 120 and the active CB 121. In contrast, a capacity of approximately 2 MB (megabytes) is required for the active GP buffer 123 in the second embodiment because a caption image is stored.

Now, a reproducing apparatus which can be applied commonly to the first and second embodiments described hereinabove is described. FIG. 31 shows a composition of an example of a reproducing apparatus 1 which can be applied to the first and second embodiments. The reproducing apparatus 1 includes a storage drive 50, a switch circuit 51, an AV decoder section 52 and a controller section 53. The storage drive 50 can receive and reproduce a BD-ROM described hereinabove loaded therein.

The controller section 53 is formed, for example, from a CPU (Central Processing Unit), a ROM (Read Only Memory) in which a program which operates on the CPU is stored in advance, a RAM (Random Access Memory) used as a working memory upon execution of a program by the CPU, and so forth. The controller section 53 controls action of the entire reproducing apparatus 1.

Further, though not shown, the reproducing apparatus 1 includes a user interface which provides predetermined information to a user and outputs a control signal in response to a user operation. For example, a remote control commander which remotely communicates with the reproducing apparatus 1 through predetermined radio communication such as infrared communication is used as the user interface. A plurality of input elements such as a direction key or keys which can indicate upward, downward, leftward and rightward directions, numerical keys and function keys to which various functions are allocated in advance are provided on the remote control commander.

The remote control commander produces a control signal in response to an operation performed for the input elements and modulates and transmits the produced control signal, for example, into and as an infrared signal. The reproducing apparatus 1 receives the infrared signal at an infrared reception section thereof not shown, converts the infrared signal into an electric signal and demodulates the electric signal to restore the original control signal. This control signal is supplied to the controller section 53. The controller section 53 controls action of the reproducing apparatus 1 in response to the control signal in accordance with the program.

The user interface may be formed not from a remote control commander but, for example, from a switch group provided on an operation panel of the reproducing apparatus 1. Also it is possible to provide the reproducing apparatus 1 with a communication section for performing communication through a LAN (Local Area Network) or the like such that a signal supplied from an external computer apparatus or the light through the communication section is supplied as a control signal by the user interface to the controller section 53.

Further, initial information of language setting of the reproducing apparatus 1 is stored into a nonvolatile memory or the like provided in the reproducing apparatus 1. The initial information of language setting is read out from the memory, for example, upon switching on of the power supply to the reproducing apparatus 1 and is supplied to the controller section 53.

If a disc is loaded into the storage drive 50, then the controller section 53 reads out the files index.bdmv and MovieObject.bdmv on the disc through the storage drive 50 and reads out a playlist file in the directory "PLAYLIST" based on the description of the read out file. The controller section 53 reads out a clip AV stream referred to by a play item included in the playlist file from the disc through the storage drive 50. Further, where the playlist includes a sub play item, the controller section 53 reads out also a clip AV stream or sub title data referred to by the sub play item from the disc through the storage drive 50.

It is to be noted that, in the following description, a clip AV stream corresponding to a sub play item is referred to as sub clip AV stream, and a clip AV stream corresponding to a principal play item with respect to a sub play item is referred to as main clip AV stream.

Data outputted from the storage drive 50 are subject to a demodulation process and an error correction process by a demodulation section and an error correction section not shown to restore a multiplexed stream. The multiplexed stream here is a transport stream which is formed from data whose types and arrangement order are discriminated based on the PID and which are divided in a predetermined size and time division multiplexed. The multiplexed stream is supplied to the switch circuit 51. The controller section 53 controls the switch circuit 51, for example, based on the PID to classify the data for the individual types and supplies packets of a main clip AV stream to a buffer 60 while it supplies packets of a sub clip AV stream to another buffer 61. The controller section 53 further supplies packets of sound data to a buffer 62 and supplies packets of text data to another buffer 63.

The packets of the main clip AV stream accumulated in the buffer 60 are read out one after another from the buffer 60 under the control of the controller section 53 and supplied to a PID filter 64. The PID filter 64 distributes the packets supplied thereto based on the PID of the packets into those packets which originate from a video stream, those packets which originate from a presentation graphics stream (hereinafter referred to as PG stream), those packets which originate from an interactive graphics stream (hereinafter referred to as IG stream) and those packets which originate from an audio stream.

On the other hand, the packets of the sub clip AV stream accumulated in the buffer 61 are read out one after another from the buffer 61 under the control of the controller section 53 and supplied to a PID filter 90. The PID filter 90 distributes the packets supplied thereto based on the PID of the packets into those packets which originate from a video stream, those packets which originate from a PG stream, those packets which originate from an IG stream and those packets which originate from an audio stream.

The packets distributed by the PID filter 64 and originating from a video stream and the packets distributed by the PID filter 90 and originating from the video stream are supplied to a PID filter 65 and distributed in response to the PID. In particular, the packets are distributed such that those packets supplied from the PID filter 64 and originating from a main clip AV stream are supplied to a first video decoder 69 and those packets supplied from the PID filter 90 and originating from a sub clip AV stream are supplied to a second video decoder 72.

The first video decoder 69 extracts a video stream from the payload of the packets supplied thereto and decodes compression codes of the extracted video stream compressed by the MPEG2 system. An output of the first video decoder 69 is supplied to a first video plane production section 70, by which a video plane is produced. The video plane is produced, for example, by writing one frame of digital video data of a baseband into a frame memory. The video plane produced by the first video plane production section 70 is supplied to a video data processing section 71.

The second video decoder 72 and a second video plane production section 73 perform processes substantially similar to those of the first video decoder 69 and the first video plane production section 70, respectively, to decode a video stream to produce a video plane. The video plane produced by the second video plane production section 73 is supplied to the video data processing section 71.

The video data processing section 71 can place the video plane produced by the first video plane production section 70 and the video plane produced by the second video plane production section 73 in a predetermined manner into one frame to produce a video plane. Alternatively, one of the video plane produced by the first video plane production section 70 and the video plane produced by the second video plane production section 73 may be selectively used to produce a video plane. This video plane corresponds, for example, to the moving picture plane 10 described hereinabove with reference to FIG. 9.

Packets distributed by the PID filter 64 and originating from a PG stream and packets distributed by the PID filter 90 and originating from the PG stream are supplied to a switch circuit 66, by which one of the packets is selected and supplied to a presentation graphics decoder 74.

The presentation graphics decoder 74 corresponds to the PG decoder 102" in the first embodiment described hereinabove (refer to FIG. 24) or the PG decoder 102" in the second embodiment described hereinabove (refer to FIG. 28). At this time, the PID filter 100 and the TB 101 shown in FIG. 24 or 28 correspond, for example, to the PID filter 64 and the buffer not shown, respectively. However, the PID filter 100 and the TB 101 may otherwise be included in the PG decoder 102' or the PG decoder 102".

The presentation graphics decoder 74 extracts and decodes a PG stream from the payload of the packets supplied thereto to produce graphics data for displaying a caption and supplies the graphics data to a switch circuit 75. In particular, the presentation graphics decoder 74 extracts data from the payload of the packets supplied thereto and re-constructs a PES packet based on information of the PID. Then, the presentation graphics decoder 74 decodes the re-constructed PES packet to form PCS, WDS, PDS and ODS segments. The PCS, WDS, PDS and ODS segments are outputted from the presentation graphics decoder 74 at the timing of the PTS defined in the PCS and are supplied to the switch circuit 75.

The switch circuit 75 selects graphics data and caption data in the form of text data hereinafter described in a predetermined manner and supplies the selected data to a presentation graphics plane production section 76. The presentation graphics plane production section 76 produces a presentation graphics plane based on the data supplied thereto and supplies the produced presentation graphics plane to the video data processing section 71. This presentation graphics plane corresponds, for example, to the caption plane 11 described hereinabove with reference to FIG. 9 and also to a caption image stored in the graphics plane 103 described hereinabove with reference to FIGS. 24 and 28.

The packets distributed by the PID filter 64 and originating from an IG stream and the packets distributed by the PID filter 90 and originating from the IG stream are supplied to a switch circuit 67, by which the former packet or the latter packets are selected and supplied to an interactive graphics decoder 77. The interactive graphics decoder 77 extracts, from the packets supplied thereto and originating from an IG stream, segments which form the IG stream and decodes the segments. The decoded segments are stored once into a preload buffer 78.

The data of the IG stream read out from the preload buffer 78 are supplied to an interactive graphics plane production section 79, by which an interactive graphics plane is produced. This interactive graphics plane corresponds, for example, to the interactive graphics plane 12 described hereinabove with reference to FIG. 9.

The video data processing section 71 includes, for example, a graphics processing section described hereinabove with reference to FIG. 11 and combines the video plane (moving picture plane 10 shown in FIG. 10), presentation graphics plane (caption plane 11 shown in FIG. 11) and interactive graphics plane (interactive graphics plane 12 shown in FIG. 11) supplied thereto to form one image data. Then, the video data processing section 71 converts the image data into a video signal and outputs the video signal.

For example, referring to FIG. 11, as regards the presentation graphics plane (that is, caption image), the palette 22A, RGB/YCbCr conversion circuit 22B and multiplier 23 correspond to the CLUT 104 described with reference to FIGS. 24 and 29. Thus, color information is added by the palette 22A and the RGB/YCbCr conversion circuit 22B and a transparent attribute is added by the multiplier 23 to the presentation graphics plane. Further, the presentation graphics plane is combined with the video plane and the interactive graphics plane by the adder 24 and the adder 29 to form one image data to be outputted.

The audio stream distributed by the PID filter 64 and the audio stream distributed by the PID filter 90 are supplied to a switch circuit 68. The switch circuit 68 selects the two audio streams supplied thereto such that one of the audio streams is supplied to a first audio decoder 80 while the other audio stream is supplied to a second audio decoder 81. The audio streams decoded by the first audio decoder 80 and the second audio decoder 81 are combined with each other by an adder 82 and further combined with the sound data read out from the buffer 62 by an adder 83. Then, resulting data are outputted.

Text data read out from the buffer 63 are processed by a Text-ST composition section 91 and then supplied to the switch circuit 75.

In the foregoing description, the components of the reproducing apparatus 1 are configured as hardware elements. However, they need not necessarily be formed as hardware elements but may otherwise be formed as processes of software. In this instance, the reproducing apparatus 1 can operate on a computer apparatus. Also it is possible to implement the reproducing apparatus 1 from a composition of a mixture of hardware and software. For example, it seems advantageous to construct any portion which involves comparatively heavy processing such as the decoders of the reproducing apparatus 1, particularly the first video decoder 69 and the second video decoder 72, from hardware and construct the other portion from software.

Further, in the foregoing description, video data, audio data, a presentation graphics stream and an interactive graphics stream are read out from a disc type recording medium such as an optical disc. However, this composition is not essentially required. For example, also it is possible to retain part or all of data in a recording medium other than an optical disc such as a hard disc drive provided in the reproducing apparatus or a semiconductor memory and read out the data from the recording medium.

A program to be executed by a computer apparatus where the reproducing apparatus 1 is configured only from software or from a combination of hardware and software is recorded on and provided together with a recording medium such as, for example, a CD-ROM (Compact Disc-Read Only Memory) or a DVD-ROM (Digital Versatile Disc Read Only Memory). If the recording medium is loaded into a drive of the computer apparatus to install the program recorded on the recording medium into the computer apparatus, then the processes described above can be placed into an executable state on the computer apparatus. The program may be recorded also on a BD-ROM. It is to be noted that description of the composition of the computer apparatus is omitted herein because it is publicly known.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A reproducing apparatus, comprising:

an input section from which at least content data and graphics data having defined reproducing time for being displayed in an overlapping relationship with a main image to be formed from the content data are inputted;

an operation input section configured to accept a user operation which indicates that an image should be displayed or should not be displayed based on the graphics data;

a first storage section into which the graphics data inputted from said input section is stored;

a second storage section into which the graphics data read out from said first storage section is stored;

an output section configured to form an output image based on the graphics data; and a control section configured to read out the graphics data stored in said first storage section at the reproducing time and output the graphics data and to store the graphics data into said second storage section and abandon the graphics data from said first storage section, said control section controlling said first storage section to be cleared when the graphics data of a first unit composed of a plurality of graphics data having a predetermined definition is inputted from said input section, said control section outputting the graphics data stored in said second storage section to said output section in response to the user operation which indicates that an image based on the graphics data should be displayed to said operation input section, such that the graphics data is displayed to overlap the main image, wherein the graphics data includes a first segment in which shape information is placed, said second storage section storing at least the first segment.

2. The reproducing apparatus according to claim 1, wherein said second storage section retains the graphics data stored therein until the reproducing time defined in the graphics data outputted next to the graphics data.

3. The reproducing apparatus according to claim 1, wherein said second storage section retains the graphics data stored therein until the reproducing time defined in the graphics data of the first unit next to the unit to which the graphics data belongs.

4. The reproducing apparatus according to claim 1, wherein the graphics data includes a second segment in which basic information is placed, a third segment in which display framework information is placed, and a fourth segment in which color information is placed, the second segment including reference information to the first, third and fourth segments, said second storage section further storing at least the second and fourth segments.

5. A reproducing method, comprising the steps of:
inputting at least content data and graphics data having defined reproducing time for being displayed in an overlapping relationship with a main image to be formed from the content data;
inputting operation for accepting a user operation which indicates that an image should be displayed or should not be displayed based on the graphics data;
storing the graphics data inputted by the process at the input step into a first storage section;
outputting for forming an output image based on the graphics data; and
controlling, for reading out the graphics data stored in said first storage section at the reproducing time, causing the output step to output the graphics data, storing the graphics data into a second storage section and abandoning the graphics data from said first storage section, and controlling said first storage section to be cleared when the graphics data of a first unit composed of a plurality of graphics data having a predetermined definition is inputted by the process at the input step,
the controlling step causing the graphics data stored in said second storage section to be outputted at the output section in response to the user operation which indicates that an image based on the graphics data should be displayed and is accepted by the process at the operation input step, such that the graphics data is displayed to overlap the main image, wherein the graphics data includes a first segment in which shape information is placed, said second storage section storing at least the first segment.

6. A reproducing program product stored on a non-transitory computer readable medium for causing a computer apparatus to execute a reproducing method, comprising the steps of:
inputting at least content data and graphics data having defined reproducing time for being displayed in an overlapping relationship with a main image to be formed from the content data;
inputting operation for accepting a user operation which indicates that an image should be displayed or should not be displayed based on the graphics data;
storing the graphics data inputted by the process at the input step into a first storage section;
outputting for forming an output image based on the graphics data; and
controlling, for reading out the graphics data stored in said first storage section at the reproducing time, causing the output step to output the graphics data, storing the graphics data into a second storage section and abandoning the graphics data from said first storage section, and controlling said first storage section to be cleared when the graphics data of a first unit composed of a plurality of graphics data having a predetermined definition is inputted by the process at the input step,
the controlling step causing the graphics data stored in said second storage section to be outputted at the output section in response to the user operation which indicates that an image based on the graphics data should be displayed and is accepted by the process at the operation input step, such that the graphics data is displayed to overlap the main image, wherein the graphics data includes a first segment in which shape information is placed, said second storage section storing at least the first segment.

7. A reproducing apparatus, comprising:
an input section from which at least content data and graphics data having defined reproducing time for being displayed in an overlapping relationship with a main image to be formed from the content data are inputted;
an operation input section configured to accept a user operation which indicates that an image should be displayed or should not be displayed based on the graphics data;
a display image composition data formation section configured to form display image composition data for configuring a display image based on the graphics data;
a first storage section configured to store the display image composition data formed by said display image composition data formation section;
a second storage section configured to store the display image composition data stored in said first storage section; and
a control section configured to control said first and second storage sections such that the display image composition data formed by said display image composition data formation section is stored into said first storage section at the reproducing time and the display image composition data is stored into said second storage section at the reproducing time and to further control so as to clear said first storage section when the graphics data of a first unit composed of a plurality of graphics data having a predetermined definition is inputted from said input section,
output image data being formed based on the display image composition data stored in said storage section,
said control section causing the display image composition data stored in said second storage section to be stored into said first storage section in response to the user operation which indicates that an image based on the graphics data should be displayed to said operation input section, such that the graphics data is displayed to overlap the main image, wherein the graphics data includes a first segment in which shape information is placed, said second storage section storing at least the first segment.

8. The reproducing apparatus according to claim 7, wherein said second storage section retains the display image composition data stored therein until the reproducing time defined in the graphics data corresponding to the output image data to be outputted next to the output image data.

9. The reproducing apparatus according to claim 7, wherein said second storage section retains the display image composition data stored therein until the reproducing time defined in the graphics data of the first unit next to the unit to which the graphics data corresponding to the display image composition data belongs.

10. The reproducing apparatus according to claim 7, wherein the display image composition data includes display information including coordinate information and color information.

11. A reproducing method, comprising the steps of:
inputting at least content data and graphics data having defined reproducing time for being displayed in an overlapping relationship with a main image to be formed from the content data;
inputting operation for accepting a user operation which indicates that an image should be displayed or should not be displayed based on the graphics data;
forming display image composition data for configuring a display image based on the graphics data; and
controlling first and second storage sections such that the display image composition data formed by the process at the display image composition data formation step is stored into a first storage section at the reproducing time and the display image composition data is stored into a second storage section at the reproducing time and controlling so as to clear said first storage section when the graphics data of a first unit composed of a plurality of graphics data having a predetermined definition is inputted by the process at the input step,
output image data being formed based on the display image composition data stored in said storage section,
the controlling step causing the display image composition data stored in said second storage section to be stored into said first storage section in response to the user operation which indicates that an image based on the graphics data should be displayed and is accepted by the process at the operation input step, such that the graphics data is displayed to overlap the main image, wherein the graphics data includes a first segment in which shape information is placed, said second storage section storing at least the first segment.

12. A reproducing program stored on a non-transitory computer readable medium for causing a computer apparatus to execute a reproducing method, comprising the steps of:
inputting at least content data and graphics data having defined reproducing time for being displayed in an overlapping relationship with a main image to be formed from the content data;
inputting operation for accepting a user operation which indicates that an image should be displayed or should not be displayed based on the graphics data;
forming display image composition data for configuring a display image based on the graphics data; and
controlling first and second storage sections such that the display image composition data formed by the process at the display image composition data formation step is stored into a first storage section at the reproducing time and the display image composition data is stored into a second storage section at the reproducing time and controlling so as to clear said first storage section when the graphics data of a first unit composed of a plurality of graphics data having a predetermined definition is inputted by the process at the input step,
output image data being formed based on the display image composition data stored in said storage section,
the controlling step causing the display image composition data stored in said second storage section to be stored into said first storage section in response to the user operation which indicates that an image based on the graphics data should be displayed and is accepted by the process at the operation input step, such that the graphics data is displayed to overlap the main image, wherein the graphics data includes a first segment in which shape information is placed, said second storage section storing at least the first segment.

\* \* \* \* \*